US012695490B2

(12) United States Patent
Lu et al.

(10) Patent No.: US 12,695,490 B2
(45) Date of Patent: Jul. 28, 2026

(54) JOINT BEAMFORMING WEIGHTS AND IQ DATA SCALING APPROACH FOR IMPROVED FRONTHAUL

(71) Applicant: Telefonaktiebolaget LM Ericsson (PUBL), Stockholm (SE)

(72) Inventors: Chenguang Lu, Sollentuna (SE); Yezi Huang, Täby (SE); Björn Pohlman, Järfälla (SE); Miguel Berg, Sollentuna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 333 days.

(21) Appl. No.: 18/552,535

(22) PCT Filed: Mar. 31, 2022

(86) PCT No.: PCT/SE2022/050319
§ 371 (c)(1),
(2) Date: Sep. 26, 2023

(87) PCT Pub. No.: WO2022/211716
PCT Pub. Date: Oct. 6, 2022

(65) Prior Publication Data
US 2024/0171241 A1 May 23, 2024

Related U.S. Application Data

(60) Provisional application No. 63/169,653, filed on Apr. 1, 2021.

(51) Int. Cl.
H04B 7/06 (2006.01)
H04B 7/0452 (2017.01)
H04B 7/0456 (2017.01)

(52) U.S. Cl.
CPC ......... H04B 7/0617 (2013.01); H04B 7/0456 (2013.01); H04B 7/0452 (2013.01)

(58) Field of Classification Search
CPC ... H04B 7/0617; H04B 7/0452; H04B 7/0456
See application file for complete search history.

(56) References Cited

U.S. PATENT DOCUMENTS

2013/0208619 A1* 8/2013 Kudo ................... H04L 5/0053
370/252
2019/0238163 A1* 8/2019 Talwar ............... H03M 7/3059
(Continued)

FOREIGN PATENT DOCUMENTS

WO 2020256609 A1 12/2020

OTHER PUBLICATIONS

O-RAN.WG4.CUS.0-v03.00; O-RAN Fronthaul Working Group; Control, User and Synchronization Plane Specification—2020.
(Continued)

*Primary Examiner* — Sharmin Chowdhury
*Assistant Examiner* — Phillip J Kearns
(74) *Attorney, Agent, or Firm* — Baker Botts L.L.P.

(57) ABSTRACT

A method 1700 is performed by a baseband unit (BBU) 104 for scaling beamforming weights (BFWs) to assist a Radio Unit (RU) 102 with beamforming. The method includes obtaining 1702 a plurality of frequency-domain BFWs for beamforming of a number of downlink data streams in frequency-domain to be transmitted to at least one wireless device via a plurality of antennas. The BBU scales 1704 the plurality of frequency-domain BFWs based on at least one scaling factor and compresses 1706 the plurality of scaled frequency-domain BFWs. The BBU transmits 1708, to the RU, the scaled frequency-domain BFWs that have been compressed. The BBU also determines 1710 at least one user plane scaling factor for frequency-domain user plane IQ
(Continued)

data, scales 1712 the frequency-domain user plane IQ data
based on the user plane scaling factors, and transmits 1714
the scaled frequency-domain user plane IQ data to the RU.

26 Claims, 20 Drawing Sheets

(56)                    References Cited

U.S. PATENT DOCUMENTS

| 2021/0126760 | A1* | 4/2021 | Lee | H04B 7/0617 |
| 2021/0273704 | A1* | 9/2021 | Ahmed | H04B 7/0617 |
| 2022/0159637 | A1* | 5/2022 | Kundu | H04B 7/0413 |
| 2022/0255596 | A1* | 8/2022 | Lu | H04B 7/0413 |

OTHER PUBLICATIONS

O-RAN.WG4.CUS.0-v05.00; O-RAN Fronthaul Working Group;
Control, User and Synchronization Plane Specification—2021.
PCT International Search Report issued for International application
No. PCT/SE2022/050319—Jul. 5, 2022.
PCT Written Opinion of the International Searching Authority
issued for International application No. PCT/SE2022/050319—Jul.
5, 2022.

* cited by examiner

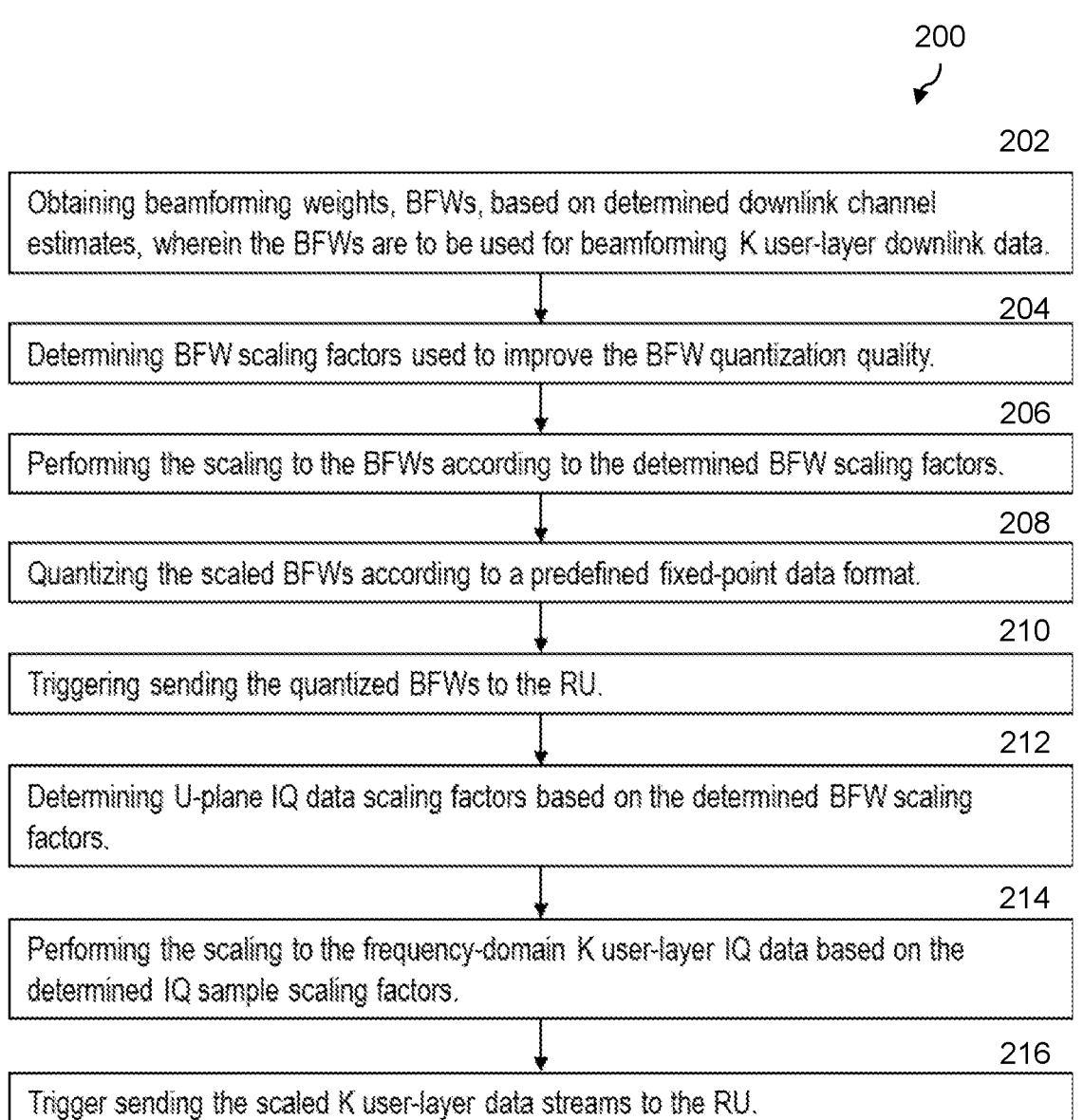

200

202

Obtaining beamforming weights, BFWs, based on determined downlink channel estimates, wherein the BFWs are to be used for beamforming K user-layer downlink data.

204

Determining BFW scaling factors used to improve the BFW quantization quality.

206

Performing the scaling to the BFWs according to the determined BFW scaling factors.

208

Quantizing the scaled BFWs according to a predefined fixed-point data format.

210

Triggering sending the quantized BFWs to the RU.

212

Determining U-plane IQ data scaling factors based on the determined BFW scaling factors.

214

Performing the scaling to the frequency-domain K user-layer IQ data based on the determined IQ sample scaling factors.

216

Trigger sending the scaled K user-layer data streams to the RU.

Receive, from the BBU, BFWs related to a number of subcarriers.

304

Receive, from the BBU, K user-layer downlink data streams to be sent to a number of UEs.

306

Conducting beamforming based on the received BFWs and the received frequency-domain IQ samples on respective subcarrier.

308

Sending the beamformed signals to the next step of the transmitter.

1300

1700

JOINT BEAMFORMING WEIGHTS AND IQ DATA SCALING APPROACH FOR IMPROVED FRONTHAUL

PRIORITY

This nonprovisional application is a U.S. National Stage Filing under 35 U.S.C. § 371 of International Patent Application Serial No. PCT/SE2022/050319 filed Mar. 31, 2022 and entitled "JOINT BEAMFORMING WEIGHTS AND IQ DATA SCALING APPROACH FOR IMPROVED FRONTHAUL" which claims priority to U.S. Provisional Patent Application No. 63/169,653 filed Apr. 1, 2021, both of which are hereby incorporated by reference in their entirety.

TECHNICAL FIELD

The present disclosure relates, in general, to wireless communications and, more particularly, systems and methods for joint scaling of beamforming weights and In-phase/Quadrature (IQ) data for improved fronthaul.

BACKGROUND

In 4th Generation (4G), Massive Multiple Input Multiple Output (MIMO) techniques were first adopted to practice in Long Term Evolution (LTE). In 5th Generation (5G) New Radio (NR), it becomes one key technology component, which will be deployed in a much larger scale than in LTE. It features with a large number of antennas used on the base-station side, where the number of antennas is typically much larger than the number of user-layers, for example, 64 antennas serving 8 or 16 user-layers in frequency range 1 (FR1), which comprises sub-6 GHz frequency bands, and 256/512 antennas serving 2 or 4 layers in FR2, which comprises frequency bands from 24.25 GHz to 52.6 GHz. Massive MIMO is also referred to as massive beamforming, which is able to form narrow beams focusing on different directions to counteract against the increased path loss at higher frequency bands. It also benefits multi-user MIMO, which allows for transmissions from/to multiple users simultaneously over separate spatial channels resolved by the massive MIMO technologies, while keeping high capacity for each user. Therefore, it can significantly increase the spectrum efficiency and cell capacity.

The great benefits of massive MIMO at the air-interface also introduce new challenges at the base-station side. The legacy Common Public Radio Interface (CPRI)-type fronthaul transports time-domain In-phase/Quadrature (IQ) samples per antenna branch. As the number of antennas scales up in massive MIMO systems, the required fronthaul capacity also increases proportionally, which significantly drives up the fronthaul costs. To address this challenge, the fronthaul interface evolves from Common Public Radio Interface (CPRI) to the new packet-based fronthaul interface, evolved CPRI (eCPRI). In eCPRI, other functional split options between a baseband unit (BBU) and a radio unit (RU) are supported, referred to as different lower-layer split (LLS) options. The basic idea is to move at least part of the frequency-domain beamforming function from BBU to RU so that frequency-domain IQ samples or data of user-layers are transported over the fronthaul interface. Note that the frequency-domain beamforming is sometimes also referred to as precoding in the downlink (DL) direction. By doing this, the required fronthaul capacity and thereby the fronthaul costs are significantly reduced, as the number of user layers is much fewer than the number of antennas in massive MIMO.

As used herein, a RU is a network node comprising of radio functions including a portion of physical layer (PHY) functions according to an LLS option. The RU performs conversion between radio frequency (RF) signals and baseband signals. At the network end, it transmits and receives the baseband signal to and from BBU through a fronthaul interface such as, for example, eCPRI. At the other end, it transmits and receives the RF signals to and from user equipments (UEs) through its antennas. As used herein, a BBU is a network node performing baseband processing. It further connects to the core network with a backhaul interface. Note that BBU and RU are referred to as O-DU and O-RU, respectively, in Open-Radio Access Network (O-RAN). See, O-RAN Alliance, Working Group 4, Control, User and Synchronization Plane Specification, O-RAN.WG4.CUS.0-V08.

In some terminologies, RU can be also referred to as RRU (remote radio unit) and BBU can also be referred to as a digital unit or distributed unit (DU). In eCPRI terminologies, BBU and RU are referred to as eCPRI Radio Equipment Control (eREC) and eCPRI Radio Equipment (eRE), respectively. In another terminology, BBU and RU may be referred to as Lower Layer Split-Central Unit (LLS-CU) and Lower Layer Split-Distributed Unit (LLS-DU), respectively.

As an example, FIG. 1 illustrates a block diagram of an O-RAN LLS option in the DL direction for Category-B (Cat-B) radio. The PHY functional blocks above O-RAN Fronthaul (FH) is hosted by an O-DU, whereas the PHY functional blocks below O-RAN FH is hosted by an O-RU. In O-RAN, the frequency-domain beamforming is referred to as precoding and beamforming, as shown in FIG. 1. As used herein, for convenience, the terms frequency-domain beamforming or beamforming are used. As used herein, beamforming means, for example, a technique involving multiplying a frequency-domain signal with different weights (in frequency-domain) at multiple antennas. This may be done to control the radiation according to a wanted beam pattern, forming a directional beam (local maxima) to certain directions, or forming nulling (local minima) to certain directions, or the combination of both.

To cover a general case not limited by O-RAN only, the more general term of BBU is used herein instead of O-DU. Likewise, the more general term of RU is used instead of O-RU. Note the BBU or O-DU can be implemented by software or virtualized as Baseband Processing Function in a Cloud environment.

Certain problems exist. For example, beamforming weights (BFWs) are determined based on channel estimation of wireless communication channels between a number of UEs and a number, N, of antennas of the base station. Note that the term antenna used here can be an antenna subarray connected to the same power amplifier (PA) and transceiver chain. An antenna, as used herein, may also be referred to as a TRX in O-RAN terminology. With reciprocity-assisted beamforming, the frequency-domain user-layer signals (or IQ data) are multiplied with the BFWs, which converts the user-layer signal to the beamformed frequency-domain antenna signal or IQ data for each antenna of the RU. The beamformed frequency-domain signals of each antenna are further transformed to the time-domain antenna signal by inverse Fast Fourier Transform (IFFT). Then the time-domain antenna signals will be converted to RF signals, which will be sent to UEs via the number of transmit antennas of the RU.

In O-RAN, one set of BFWs are calculated per physical resource block (PRB) bundle, which represents one or multiple PRBs, e.g., 2 PRBs, where each PRB has 12 subcarriers in LTE and NR. For example, the BFWs can be calculated using the channel estimate of a subcarrier in the middle of the PRB bundle and then the same BFWs can be used on each subcarrier in the same PRB bundle for performing frequency-domain beamforming. Typically, the BFWs are scaled or normalized according to certain criteria. Then the scaled BFWs are compressed with fewer bits than that used for BFW calculation, in order to reduce the amount of BFW data sent to RU. Different compression methods are available in O-RAN e.g. (1) block floating point (BFP) data format, (2) fixed point data format, and (3) block scaling compression method defined in O-RAN.

BFP data format has some advantages, but it is not a mandatory format in O-RAN, which means that fixed-point may be needed for interoperability in certain cases. However, when one simply reduces the number of bits of fixed-point format (e.g., reduce from 16 bits to 8 bits), the quantization step size gets larger and thereby the precision is reduced due to higher quantization noise. This is especially true when the BFW values are small. The reduced precision causes beamforming performance degradation due to uncancelled interferences.

The block scaling compression method defined in O-RAN can mitigate this issue. Block scaling scales the elements in each column (a column corresponds to a spatial stream or a layer) of the BFW matrix such that the I and Q values of BFWs are divided by a block scaling factor, which equals to the max absolute value of the I and Q values (i.e. the real and imaginary part) of the elements in the column. Then, the scaled I and Q values of BFWs are quantized with certain number of bits in fixed point. Both the quantized BFWs and the block scaling factors are sent to the RU. The RU uses the received block scaling factors to descale the BFWs and unpack (convert to RU native data format for further processing) the BFWs. Basically, the small BFWs are scaled larger by block scaling before quantization. Then the SQNR (signal to quantization noise ratio) is increased and therefore the precision is improved. The beamforming performance is thereby improved given the same number of bits used. However, it requires BBU and RU to implement the block scaling mechanism, which adds complexity. Especially, RU needs to do the descaling operation and some RUs may not have suitable hardware/software resources to do this. FIG. 2 illustrates a previous technique for block scaling compression method in O-RAN.

FIG. 3 illustrates a previous technique without using block scaling compression method. Instead of directly quantizing the BFWs, it can perform BFW scaling without the descaling operation in RU. However, the RU will use the scaled BFWs directly, which is not optimal for beamforming and, therefore, affects beamforming performance. This is the reason that the block scaling method performs the decaling operation in RU to reconstruct the original unscaled BFWs.

SUMMARY

Certain aspects of the present disclosure and their embodiments may provide solutions to these or other challenges. For example, according to certain embodiments, methods and systems for joint scaling of beamforming weights (BFWs) and user plane In-phase/Quadrature (IQ data) are provided for improved fronthaul.

According to certain embodiments, a method by a baseband unit (BBU) for scaling BFWs to assist a Radio Unit (RU) with beamforming is provided. The method includes obtaining a frequency-domain BFWs for beamforming of a number of downlink data streams in frequency-domain to be transmitted to at least one wireless device via a plurality of antennas. The BBU scales the plurality of frequency-domain BFWs based on at least one scaling factor. The BBU compresses the plurality of scaled frequency-domain BFWs and transmits, to the RU, the scaled frequency-domain BFWs that have been compressed. The BBU determines at least one user plane scaling factor for frequency-domain user plane IQ data and scales the frequency-domain user plane IQ data based on the user plane scaling factors. The BBU transmits the scaled frequency-domain user plane IQ data to the RU.

According to certain embodiments, a BBU for scaling BFWs to assist a RU with beamforming is provided. The BBU is adapted to obtain a frequency-domain BFWs for beamforming of a number of downlink data streams in frequency-domain to be transmitted to at least one wireless device via a plurality of antennas. The BBU is adapted to scale the plurality of frequency-domain BFWs based on at least one scaling factor. The BBU is adapted to compress the plurality of scaled frequency-domain BFWs and transmit, to the RU, the scaled frequency-domain BFWs that have been compressed. The BBU is adapted to determine at least one user plane scaling factor for frequency-domain user plane IQ data and scale the frequency-domain user plane IQ data based on the user plane scaling factors. The BBU is adapted to transmit the scaled frequency-domain user plane IQ data to the RU.

According to certain embodiments, a method by a RU for performing beamforming based on frequency-domain BFWs scaled by a BBU is provided. The method includes receiving, from the BBU, a plurality of scaled frequency-domain BFWs for beamforming of a number of downlink data streams in frequency domain to be transmitted to at least one wireless device. The RU decompresses the plurality of scaled frequency-domain BFWs and receives, from the BBU, scaled frequency-domain user plane IQ data for the number of downlink data streams. The scaled user plane IQ data is scaled based on at least one user plane scaling factor, and the at least one user plane scaling factor compensates for at least one scaling factor used to scale the BFWs by the BBU. The RU conducts beamforming on the number of downlink data streams in the frequency domain based on the plurality of frequency-domain BFWs and the scaled frequency-domain user plane IQ data.

According to certain embodiments, a RU for performing beamforming based on frequency-domain BFWs scaled by a BBU is provided. The RU is adapted to receive, from the BBU, a plurality of scaled frequency-domain BFWs for beamforming of a number of downlink data streams in frequency domain to be transmitted to at least one wireless device. The RU is adapted to decompress the plurality of scaled frequency-domain BFWs and receive, from the BBU, scaled frequency-domain user plane IQ data for the number of downlink data streams. The scaled user plane IQ data is scaled based on at least one user plane scaling factor, and the at least one user plane scaling factor compensates for at least one scaling factor used to scale the BFWs by the BBU. The RU is adapted to conduct beamforming on the number of downlink data streams in the frequency domain based on the plurality of frequency-domain BFWs and the scaled frequency-domain user plane IQ data.

Certain embodiments may provide one or more of the following technical advantages. For example, one technical advantage may be that certain embodiments provide an attractive alternative method which improves BFW compression for using fixed point data format without the need of using the block scaling compression method defined in O-RAN. As another example, a technical advantage may be that BFWs can be more compressed than the BFWs generated using techniques that use the fixed-point format or any other format having similar property as fixed-point which is not scaled on the block level, which would reduce the required fronthaul bit rate. According to certain embodiments, this may be transparent to RU. As such, an RU may not be required to do an additional descaling operation.

As another example, a technical advantage may be that all operations are done by the BBU. The same compression performance can be achieved as using block scaling, but without the fronthaul overhead (i.e. sending the scaling factor to RU). The complexities of both BBU and RU complexity are reduced because of not implementing block scaling. Scaling of the U-plane IQ data is not only doing the descaling of BFWs, but also enabling doing other types of scaling such as, for example, layer power allocation and/or antenna power scaling. By contrast, doing other types of scaling directly on BFWs would require more bits for representing BFWs.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 5 illustrates an example method performed by a BBU for assisting a RU in performing frequency-domain beamforming for a communication between a base station and a UE, according to certain embodiments;

DETAILED DESCRIPTION

Figure 1:
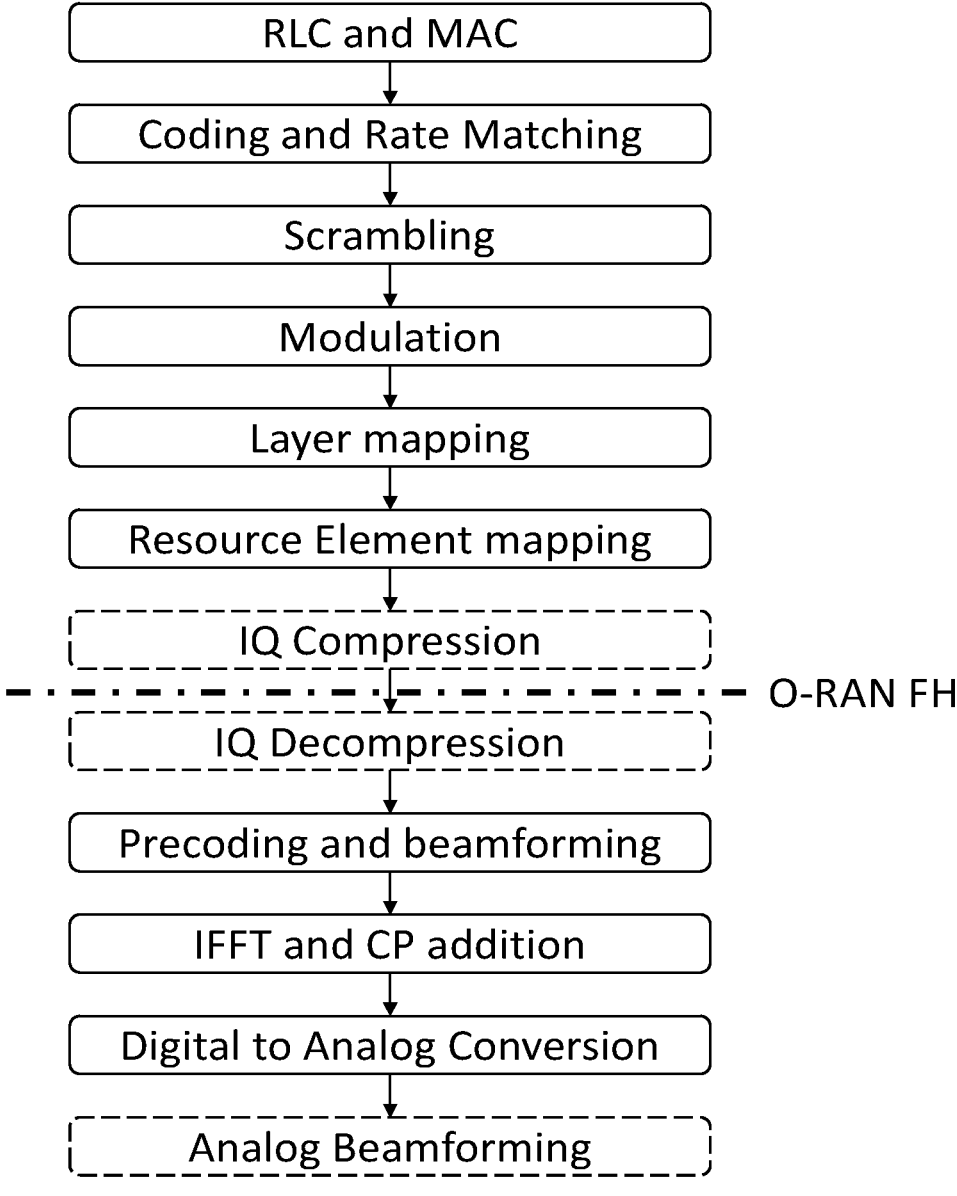
FIG. 1 illustrates a block diagram of an O-RAN LLS option in the DL direction for Cat-B radio.
Figure 2:
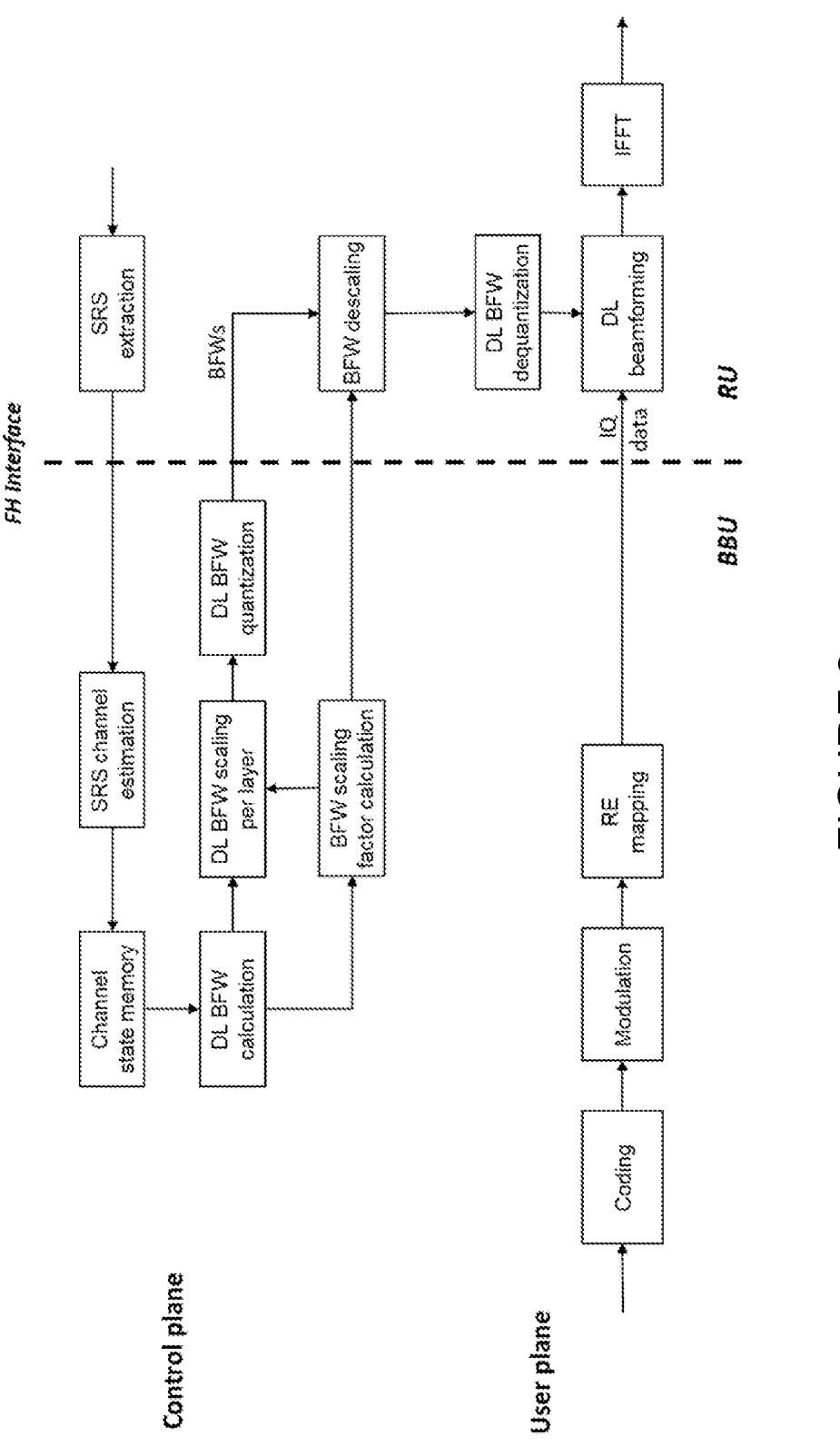
FIG. 2 illustrates a technique for block scaling compression method in O-RAN.
Figure 3:
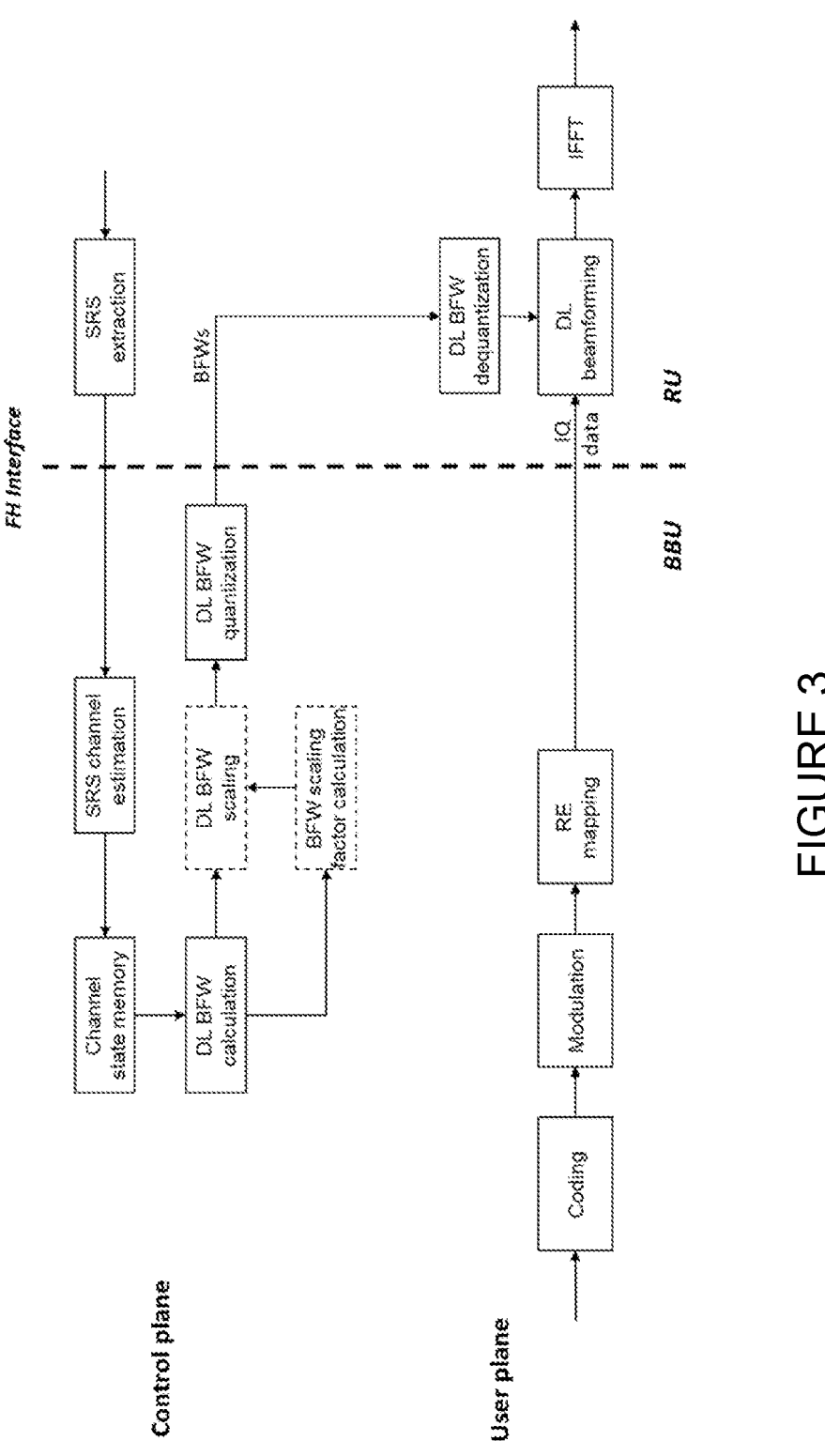
FIG. 3 illustrates a technique without using block scaling compression method.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master eNodeB (MeNB), a network node belonging to Master Cell Group (MCG) or Secondary Cell Group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations & Maintenance (O&M), Operations Support System (OSS), Self Organizing Network (SON), positioning node (e.g. Evolved-Serving Mobile Location Centre (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services UE (ProSe UE), Vehicle-to-Vehicle UE (V2V UE), Vehicle-to-Anything UE (V2X UE), etc.

Additionally, terminologies such as base station/gNB and UE should be considered non-limiting and do in particular not imply a certain hierarchical relation between the two; in general, "gNB" could be considered as device 1 and "UE" could be considered as device 2 and these two devices communicate with each other over some radio channel. And, in the following, the transmitter or receiver could be either the gNB or the UE or vice versa.

As used herein, it is to be noted that BBU could be for example an O-RAN O-DU, RU could be an O-RAN O-RU, and the FH interface could be an O-RAN Fronthaul.

According to certain embodiments, a BBU scales the I and Q values (i.e. the real and imaginary parts) of BFWs used for each layer or each spatial stream (i.e. scaling the BFW I and Q values in each column vector of the BFW matrix) to improve the BFW quantization quality such as, for example, by increasing the BFW accuracy after quantization with a given number of bits. The BBU then performs a second scaling on the user-plane (U-plane) IQ data of each layer or each spatial stream. This IQ data scaling is based on the inverse of the BFW scaling factor such that, upon receiving the I and Q values, the RU doesn't need to descale the BFW as was required by previous methods and techniques. Accordingly, RU complexity may be reduced, according to certain embodiments. When the RU performs the beamforming, the BFWs will be multiplied with IQ data in RU. As a result of the multiplication, the scaled BFW will be effectively descaled in the beamformed IQ data after the multiplication, without needing the RU to do descaling as was required by previous methods and techniques.

The BFW scaling described herein operates to scale up the I and Q values for a better quantization accuracy. For example, BFW I and Q values in each column vector of the BFW matrix may be scaled up to their maximum absolute value of I and Q values in the column vector before quantization. It means that the corresponding IQ data scaling will reduce the I and Q values of the IQ data. However, the compression methods (e.g. using BFP data format (or called BFP compression) defined in O-RAN) used for representing user plane (U-plane) IQ data over fronthaul interface have enough dynamic range to cover the scaling effect without degrading the IQ data precision. For example, when BFP data format is used, the DL and uplink (UL) usually use the same data format for implementation convenience. Since the required dynamic range for UL is higher than that for DL, the data format provides a dynamic range larger than that required in the DL. Also, there is always a margin in dynamic range. Basically, we utilize part of the supported IQ data dynamic range to improve the BFW quantization quality, which doesn't require any operation in RU. and modulation compression method In addition to inverse the BFW scaling, the IQ data scaling can optionally incorporate other scaling factors. For example, the IQ data scaling can incorporate scaling factors (1) for layer power allocation to scale each layer to have the same power or different power, and/or (2) for antenna power scaling, making sure the transmit power of each antenna not exceeding a limit.

Figure 4:
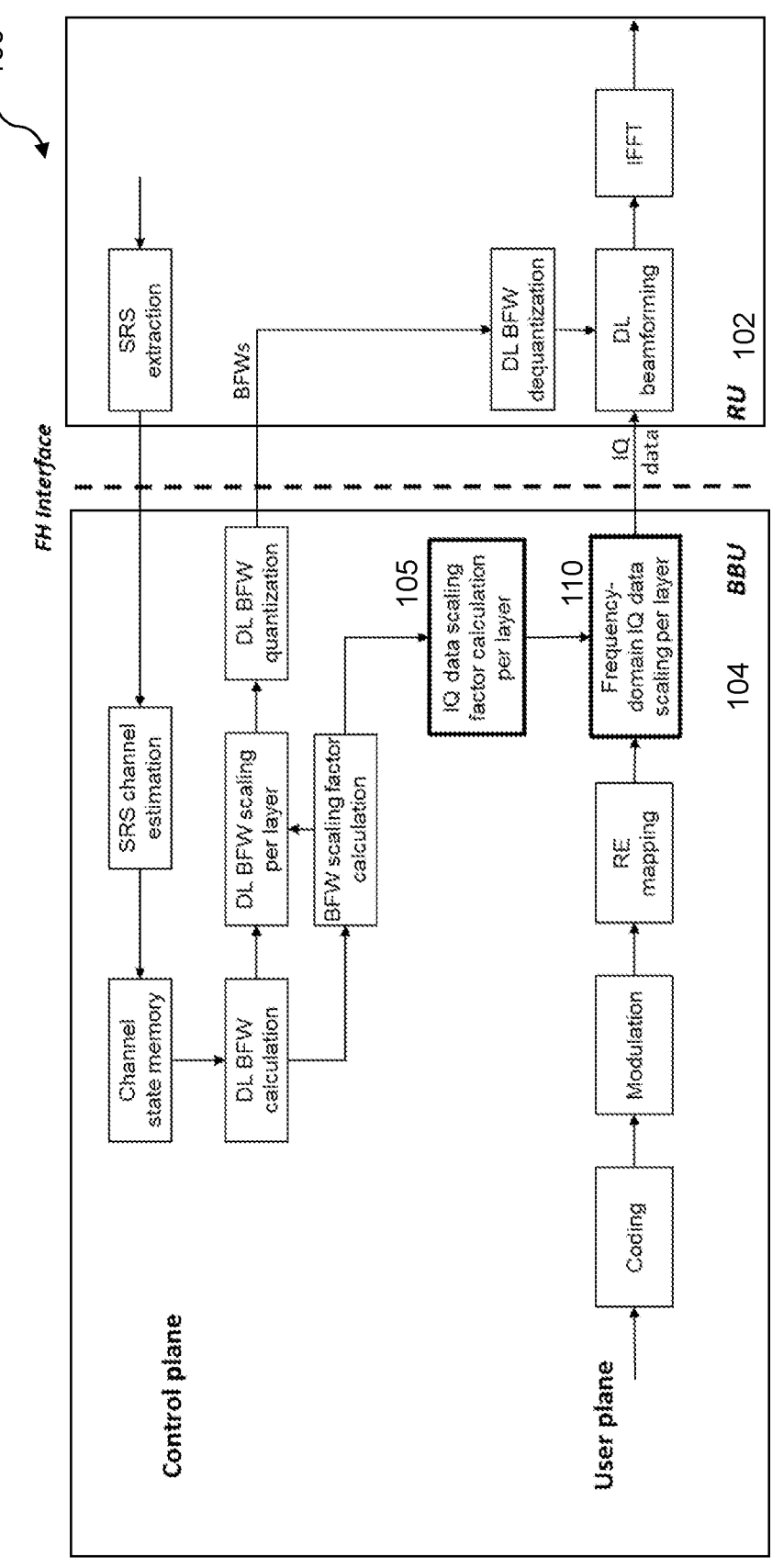
FIG. 4 illustrates an example block diagram of a scaling approach for improved fronthaul, according to certain embodiments.

FIG. 4 illustrates an example block diagram of a scaling approach 100 for improved fronthaul, according to certain embodiments. As depicted, FIG. 4 illustrates an O-RAN Cat-B radio implementation of the scaling approach 100. In the illustration, bold lines emphasize new functions and or techniques. Thus, as depicted, a new function 105 is provided in the BBU 104 for performing IQ data scaling factor calculation on a per-layer basis. Additionally, a new function 110 is provided in the BBU 104 for performing frequency domain IQ data scaling on a per-layer basis such that the RU 102 is not required to descale the BFWs. These functions are described in more detail below.

Methods at the BBU

FIG. 5 illustrates an example method 200 performed by a BBU 104 for assisting a RU 102 in performing frequency-domain beamforming for a communication between a base station and a UE, according to certain embodiments. The BBU 104 and the RU 102 may be associated with the base station. The UE and the base station may be in a wireless communications network using a multiple antenna system for communication.

As depicted in FIG. 5, according to certain embodiments, the method 200 by the BBU 104 may include a combination of one or more of the following steps:

At step 202, obtaining BFWs based on determined downlink channel estimates, wherein the BFWs are to be used for beamforming K user-layer downlink data to be sent to a number of UEs via N antennas at the RU 102.

In a particular embodiment, the downlink channel estimate is an estimate of the communication channel between the RU 102 and the UEs. For wireless communication networks based on technology that is reciprocal in the air, such as Time-Division Duplex (TDD)-based technologies, the downlink channel estimate can be determined rather accurate from uplink signals. When channel estimation is accurate such as, for example, when Signal to Interference Noise Ratio (SINR) is high, such an approach performs even better than a codebook-based approach. In TDD, for example, any difference between UL and DL channel is mainly from the radio frontend difference in UL and DL, which difference can be calibrated out. The UL signals may be reference signals originating from the number of UEs, such as sounding reference signals (SRSs), demodulation reference signals (DMRSs), etc. The reference signals may be the same reference signals from the UEs or different signals. They may be sent simultaneously or at different times.

In a particular embodiment, the BFWs are determined on a number of subcarriers out of the scheduled number of subcarriers.

At step 204, determining the BFW scaling factors used to improve the BFW quantization quality, i.e., increasing the BFW accuracy after quantization with a given number of bits, comparing to the case without scaling.

In a particular embodiment, the BFW scaling factors are determined on subcarriers where BFWs are calculated and used for beamforming.

In a particular embodiment, BFWs are scaled on per-layer basis. The BFWs of the ith column vector of a BFW matrix corresponds to the BFWs for the ith layer, which expand the frequency-domain IQ data of the ith layer to transmit at a number of antennas. There is one scaling factor determined for the BFWs per layer, i.e. per column vector of BFW matrices, on the subcarriers BFWs are calculated and used for beamforming.

In a particular embodiment, the elements (I and Q values) of each column of the BFW matrix on the respective subcarriers are scaled based on the largest absolute value of the individual real and imaginary part (i.e., I and Q values) of any BFW element in the respective column. This scaling factor is the same as used in the block scaling compression method defined in O-RAN.

In another particular embodiment, the elements of each column of the BFW matrix on the respective subcarriers are scaled based on the power of the BFW element which has the highest power value. This scaling scheme is not better than the previous scheme scaling to the maximum real or imaginary value, but it makes sure the beamforming gain to any layer on any antenna on any subcarrier is less than or equal to 1.

The particular embodiments described above are provided as examples. Other scaling schemes may be possible with other considerations. Nevertheless, using the scaling described herein improves the BFW accuracy with a given number of bits, which enables using fewer bits to represent BFWs than that without scaling at the same level of the quantization accuracy and thereby reduce the fronthaul bit rate for transport BFWs.

At step 206, performing the scaling to the BFWs according to the determined BFW scaling factors.

At step 208, quantizing the scaled BFWs according to a predefined fixed-point data format As used herein, quantization may refer to or be referred to as re-quantization. The input of the scaled BFWs are represented with B1 bits. The quantization here re-quantizes the BFWs from B1 bits to B2 bits, where B2 is smaller than B1. In this sense, the BFWs are compressed to B2 bits per BFW element. Thus, quantization may also refer to and be referred to as compression.

At step 210, triggering sending the quantized BFWs to the RU 102.

In a particular embodiment, BFWs sent to the RU 102 may be related to a portion of subcarriers out of the scheduled subcarriers. For example, a group of subcarriers share one set of BFWs.

In a particular embodiment, BFWs may be sent together with other control information assisting the beamforming operation at the RU 102. For example, in O-RAN, BFWs are sent together with other scheduling information (regarding symbol index per slot, resource block number, RE number per resource block) used for user data transmission) using the C-plane (control plane) messages.

At step 212, determining U-plane IQ data scaling factors based on the scaling factors of BFWs.

In a particular embodiment, IQ data is scaled on per-layer basis. There is one scaling factor for the IQ data of each layer on the subcarriers which will be beamformed based on the same BFWs.

The embodiments of calculating IQ sample scaling factors are further described below. In various embodiments, the IQ data scaling is used to scale the IQ data to compensate the BFW scaling.

Optionally, the IQ data scaling may also incorporate the scaling for user-layer power allocation and antenna power scaling. In this case, the scaling factor calculation needs to consider the original BFWs and the BFW scaling factor, or equivalently the scaled BFWs.

In a particular embodiment, the IQ data scaling factors are determined for each scheduled subcarrier.

If BFWs on all sub-carriers have not been calculated, particular embodiments determine IQ sample scaling factors on the remaining sub-carriers based on the IQ sample scaling factors of the subcarriers where BFWs have been calculated.

At step 214, performing the scaling to the frequency-domain K user-layer IQ data based on the determined IQ sample scaling factors per layer.

After the scaling, the scaled frequency domain user layer IQ data are usually quantized or compressed in a predefined data format to compress the IQ data, e.g., using BFP data format with a certain number of mantissa bits and exponent bits. As one example in O-RAN, 24 I and Q values of 12 subcarriers of each PRB are quantized in a BFP format with 9-bit mantissa for each I or Q values and a common 4-bit exponent shared by the 24 I and Q values. Note that IQ data quantization is not illustrated in FIG. 4.

In O-RAN, an IQ compression method called modulation compression can be also applied here, which compresses the scaled U-plane IQ data to fewer bits representing the constellation points.

At step 216, triggering sending the scaled K user-layer IQ data streams to the RU.

In O-RAN terminology, one user-layer IQ data stream can be transported as an eAxC data stream.

In O-RAN, the user-layer data are sent using U-plane messages corresponding to the C-plane messages, which indicate how each received user-layer data are scheduled in time (symbol index per slot) and frequency (resource block number and RE number) resources.

Methods at the RU

Figure 6:
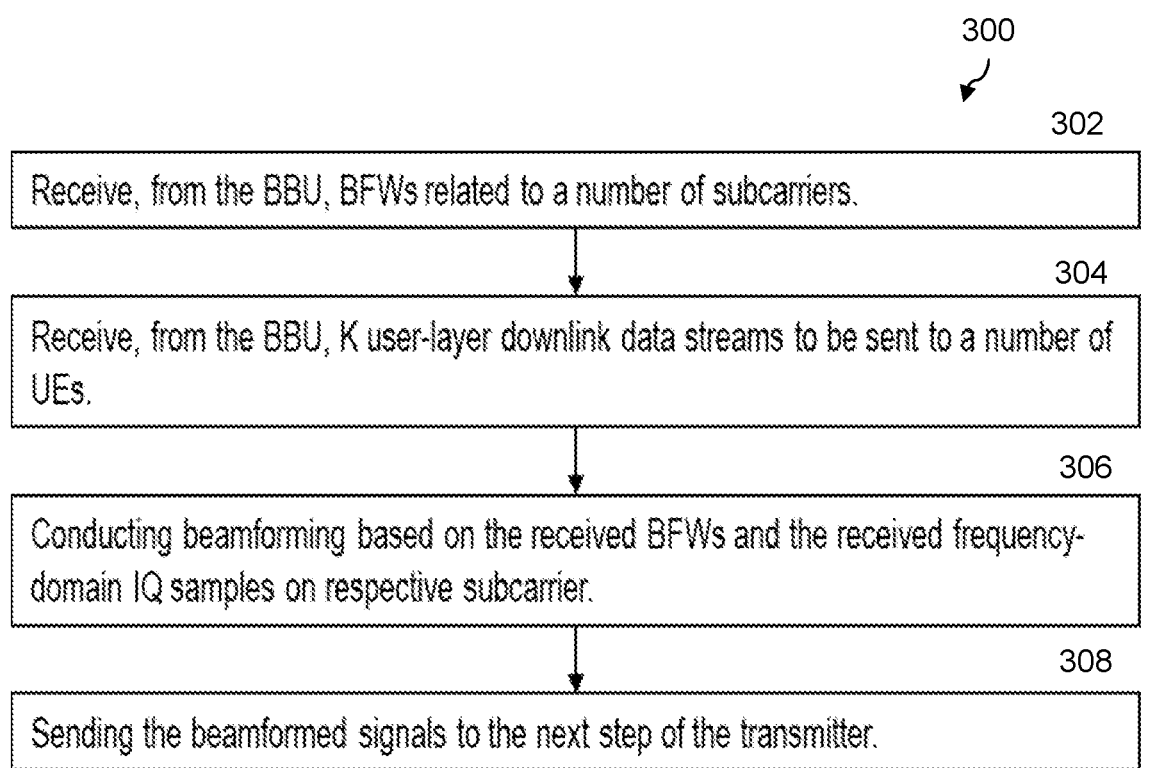
FIG. 6 illustrates a method performed by a RU for frequency-domain beamforming in cooperation with a BBU for a communication between a base station and a UE, according to certain embodiments.

FIG. 6 illustrates a method 300 performed by a RU 102 for frequency-domain beamforming in cooperation with a BBU 104 for a communication between a base station and a UE, according to certain embodiments. As described above, the RU 102 and the BBU 104 are associated with the base station.

As shown in FIG. 6, the method performed by the RU 102 includes one or more of the following steps:

At step 302, receiving, from the BBU 104, BFWs related to a number of subcarriers.

In a particular embodiment, such as in O-RAN, BFWs are carried by the C-plane messages and are assisted by scheduling information, which is also carried by the C-plane messages.

At step 304, receiving, from the BBU 104, K user-layer downlink data streams to be sent to a number of UEs.

If the received IQ data are compressed, e.g. with BFP or modulation compression, the method further comprises decompression of the IQ data, in a particular embodiment.

It may be noted that when K=1, it is to be sent to one UE.

At step 306, conducting frequency-domain beamforming based on the received BFWs and the K user-layer IQ data on respective subcarrier by multiplying the IQ data with the BFWs on the respective subcarriers.

At step 308, sending the beamformed signals to the next step of the transmitter.

Certain embodiments described above include the calculating of BFW scaling factors and U-plane IQ data scaling factors. In a particular embodiment, L may denote the number of scheduled PRB bundles or subcarrier groups (SCG), each of which contains M subcarriers and these subcarriers share the same BFWs. Let $W(l) \in \mathbb{C}^{N \times K}$ denote the downlink BFW matrix for PRB bundle l for l=1, . . . , L regarding K scheduled user-layers and N antenna elements.

BFW Scaling

According to certain embodiments, BFW scaling includes defining a diagonal matrix $D(l)=\text{diag}(d_1(l), \ldots, d_k(l))$, in which the kth diagonal element $d_k(l)$ represents the scaling factor for the kth user layer, used to scale $W(l)$. Then, the scaled BFWs can be mathematically expressed as $\overline{W}(l)=W(l) D(l)$.

In a particular embodiment, each column vector of the BFW matrix on the respective subcarriers of a PRB bundle is scaled based on the largest absolute value of real or imaginary part of any BFW element in the respective column. In this case, $$d_k(l) = 1/\max_n\{\max\{|\text{Re}\{w_{n,k}(l)\}|, |\text{Im}\{w_{n,k}(l)\}|\}\}$$

for n=1, . . . , N and k=1, . . . , K, where $w_{n,k}(l)$ denotes the element at the n-th row and the k-th column of W(l).

In another particular embodiment, each column vector of the BFW matrix on the respective subcarriers of a PRB bundle is scaled based on the power of the BFW element which has the highest power value. In this case, $$d_k(l) = 1/\max_n\|w_{n,k}(l)\|_2.$$

U-Plane IQ Data Scaling

According to a particular embodiment, the IQ data scaling factors on all the respective subcarriers of PRB bundle l for user-layer k becomes $$\lambda_k(l) = \frac{1}{d_k(l)}$$

In this way, at the BBU, the BFWs on subcarrier l is scaled with D(l) so that $\overline{W}(l)=W(l)D(l)$, where $\overline{W}(l)$ denote the scaled BFWs.

According to certain embodiments, the U-plane IQ data $x(l) \in \mathbb{C}^{K \times 1}$ are scaled with $\Lambda(l)$ where $\Lambda(l)=\text{diag}(\lambda_1(l), \ldots, \lambda_K(l))$. The scaled IQ data are denoted $\overline{x}(l)=\Lambda(l)x(l)$. RU receive the scaled BFWs $\overline{W}(l)$ and the scaled IQ data $\overline{x}(l)$. After performing the beamforming, the beamformed frequency-domain IQ data can be expressed as $y=\overline{W}(l)\overline{x}(l)$. With the multiplication of frequency domain beamforming, the BFW scaling of $d_k(l)$ is cancelled out by IQ data scaling, $$\lambda_k(l) = \frac{1}{d_k(l)},$$

in the IQ data scaling factor. Therefore, the beamformed frequency-domain IQ data becomes y=W(l)x(l), which are the intended results of the beamforming.

As described above, the IQ data scaling can incorporate some additional scaling. Accordingly, an example with an additional part for layer power allocation is now described.

First, define a diagonal matrix $\Sigma(l)=\text{diag}(\sqrt{\sigma_1(l)}, \ldots, \sqrt{\sigma_k(l)})$, where $\sigma_k(l)$ denote the desired power allocation for user-layer k for PRB bundle l. According to certain embodiments, the IQ data scaling factors on all the respective subcarriers of PRB bundle l for user-layer k becomes $$\lambda_k(l) = \frac{1}{d_k(l)} \frac{\sqrt{\sigma_k(l)}}{\sqrt{\sum_{n=1}^{N}\|w_{n,k}(l)\|_2^2}}$$

where the first term, $$\frac{1}{d_k(l)},$$

is the part for compensate the BFW scaling and the second term, $$\frac{\sqrt{\sigma_k(l)}}{\sqrt{\sum_{n=1}^{N}\|w_{n,k}(l)\|_2^2}},$$

is the part for scaling the layer power. Note that using the second term for layer power allocation is given as one example. The second term can be used for other purposes. For example, it can include a term to scale the antenna power, such that the sum of the power of the beamformed IQ data of all K user layers for all subcarriers after beamforming in RU are below a limit.

Instead of sending user-layer data from BBU 104 to RU 102 via the FH interface, it is also possible to perform precoding on the user layers in the BBU 104 to create spatial streams which are then transmitted. Such streams need not correspond directly to the data to be transmitted in each user layer. For example, interference mitigation can be performed in the BBU 104 so that each spatial stream is a linear combination of user layer streams/user layer data, the spatial streams are then beamformed in the RU 102 and scaled in the same way as had they been pure user layers, as described above. Similarly, the beamforming weights will also be scaled on the basis of the spatial streams. Hence certain embodiments may be applied to spatial streams in general and not only to pure user layer data.

Figure 7:
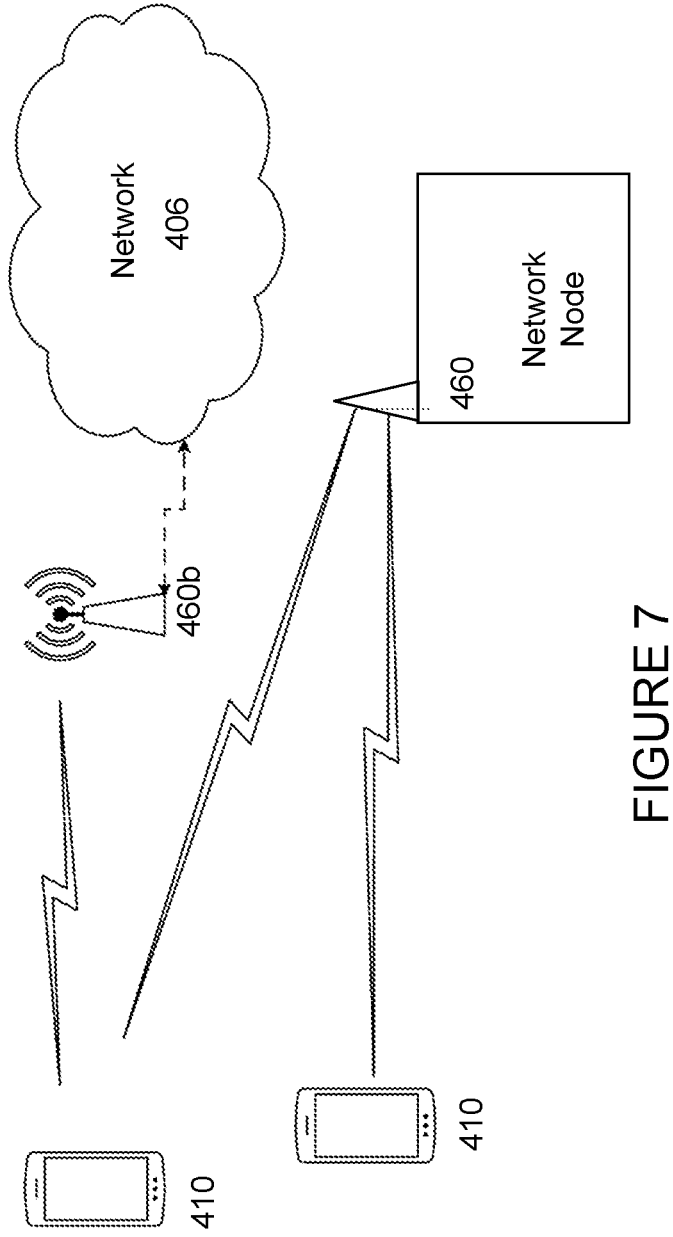
FIG. 7 illustrates an example wireless network, according to certain embodiments.

FIG. 7 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 406, network nodes 460 and 460b, and wireless devices 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, 5G NR, and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and wireless device 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 8:
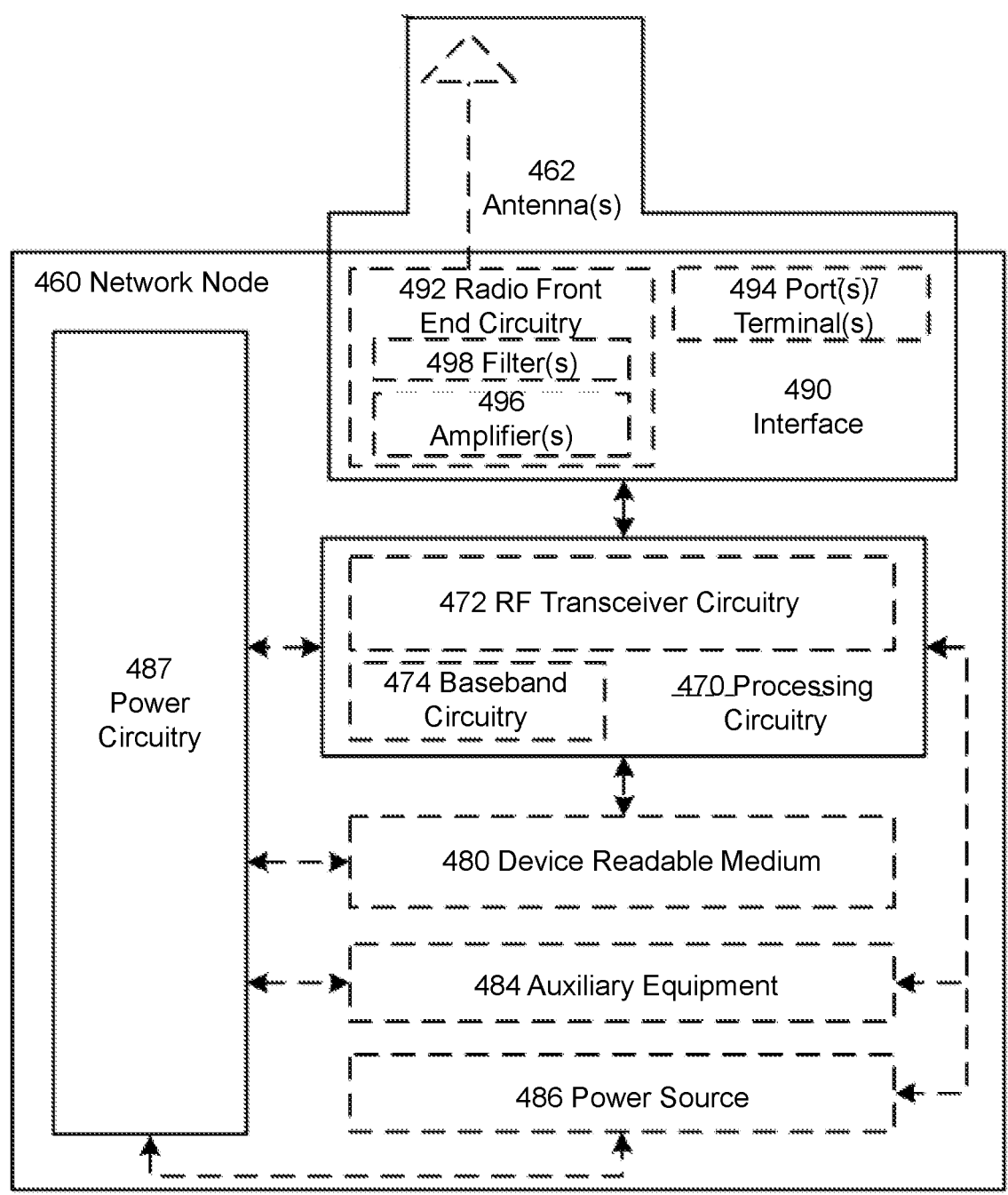
FIG. 8 illustrates an example network node, according to certain embodiments.

FIG. 8 illustrates an example network node 460, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 460 includes processing circuitry 470, device readable medium 480, interface 490, auxiliary equipment 484, power source 486, power circuitry 487, and antenna 462. Although network node 460 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units.

In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460 but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or wireless devices 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or wireless devices via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 492 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 8 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

Figure 9:
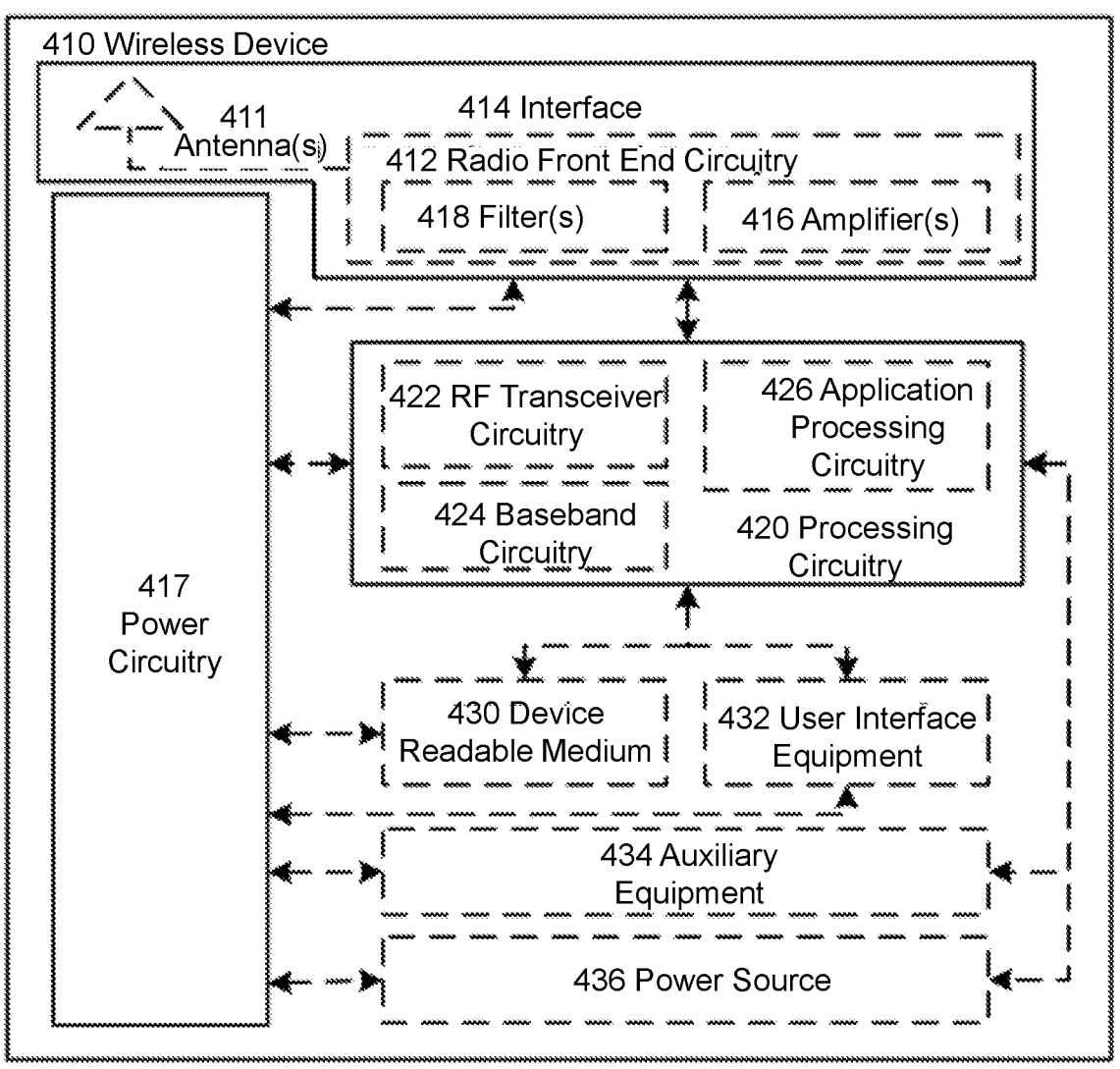
FIG. 9 illustrates an example wireless device, according to certain embodiments.

FIG. 9 illustrates an example wireless device 410. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. Wireless device 410 may include multiple sets of one or more of the illustrated components for different wireless technologies supported by wireless device 410, such as, for example, GSM, WCDMA, LTE, NR, WiFi, WiMAX, or Bluetooth wireless technologies, just to mention a few. These wireless technologies may be integrated into the same or different chips or set of chips as other components within wireless device 410.

Antenna 411 may include one or more antennas or antenna arrays, configured to send and/or receive wireless signals, and is connected to interface 414. In certain alternative embodiments, antenna 411 may be separate from wireless device 410 and be connectable to wireless device 410 through an interface or port. Antenna 411, interface 414, and/or processing circuitry 420 may be configured to perform any receiving or transmitting operations described herein as being performed by a wireless device. Any information, data and/or signals may be received from a network node and/or another wireless device. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 412 is connected to antenna 411 and processing circuitry 420 and is configured to condition signals communicated between antenna 411 and processing circuitry 420. Radio front end circuitry 412 may be coupled to or a part of antenna 411. In some embodiments, wireless device 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or wireless devices via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 410 components, such as device readable medium 430, wireless device 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of wireless device 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a wireless device may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hardwired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of wireless device 410, but are enjoyed by wireless device 410 as a whole, and/or by end users and the wireless network generally.

Processing circuitry 420 may be configured to perform any determining, calculating, or similar operations (e.g., certain obtaining operations) described herein as being performed by a wireless device. These operations, as performed by processing circuitry 420, may include processing information obtained by processing circuitry 420 by, for example, converting the obtained information into other information, comparing the obtained information or converted information to information stored by wireless device 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with wireless device 410. Such interaction may be of many forms, such as visual, audial, tactile, etc. User interface equipment 432 may be operable to produce output to the user and to allow the user to provide input to wireless device 410. The type of interaction may vary depending on the type of user interface equipment 432 installed in wireless device 410. For example, if wireless device 410 is a smart phone, the interaction may be via a touch screen; if wireless device 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into wireless device 410 and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from wireless device 410, and to allow processing circuitry 420 to output information from wireless device 410. User interface equipment 432 may include, for example, a speaker, a display, vibrating circuitry, a USB port, a headphone interface, or other output circuitry. Using one or more input and output interfaces, devices, and circuits, of user interface equipment 432, wireless device 410 may communicate with end users and/or the wireless network and allow them to benefit from the functionality described herein.

Auxiliary equipment 434 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. wireless device 410 may further comprise power circuitry 437 for delivering power from power source 436 to the various parts of wireless device 410 which need power from power source 436 to carry out any functionality described or indicated herein. Power circuitry 437 may in certain embodiments comprise power management circuitry. Power circuitry 437 may additionally or alternatively be operable to receive power from an external power source; in which case wireless device 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of wireless device 410 to which power is supplied.

Figure 10:
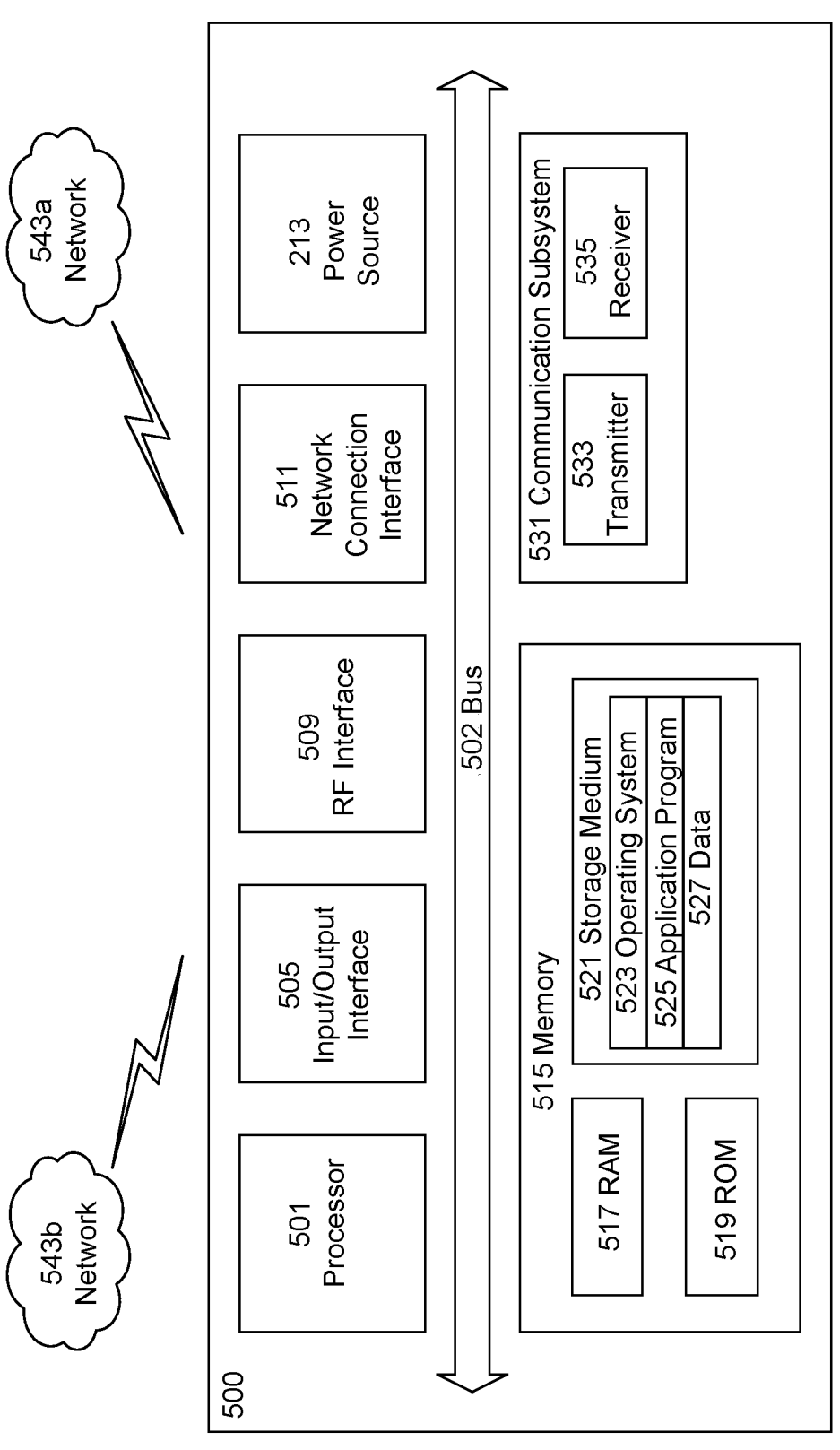
FIG. 10 illustrate an example user equipment, according to certain embodiments.

FIG. 10 illustrates one embodiment of a UE 500 in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 500 may be any UE identified by the $3^{rd}$ Generation Partnership Project (3GPP), including a NB-IOT UE, a machine type communication (MTC) UE, and/or an enhanced MTC (eMTC) UE. UE 500, as illustrated in FIG. 8, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 10 is a UE, the components discussed herein are equally applicable to a wireless device, and vice-versa.

In FIG. 10, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 10, or only a subset of the components.

The level of integration between the components may vary from one UE to another UE. Further, certain UEs may contain multiple instances of a component, such as multiple processors, memories, transceivers, transmitters, receivers, etc.

In FIG. 10, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 10, processing circuitry 501 may be configured to communicate with network 543*b* using communication subsystem 531. Network 543*a* and network 543*b* may be the same network or networks or different network or networks. Communication subsystem 531 may be configured to include one or more transceivers used to communicate with network 543*b*. For example, communication subsystem 531 may be configured to include one or more transceivers used to communicate with one or more remote transceivers of another device capable of wireless communication such as another wireless device, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 11:
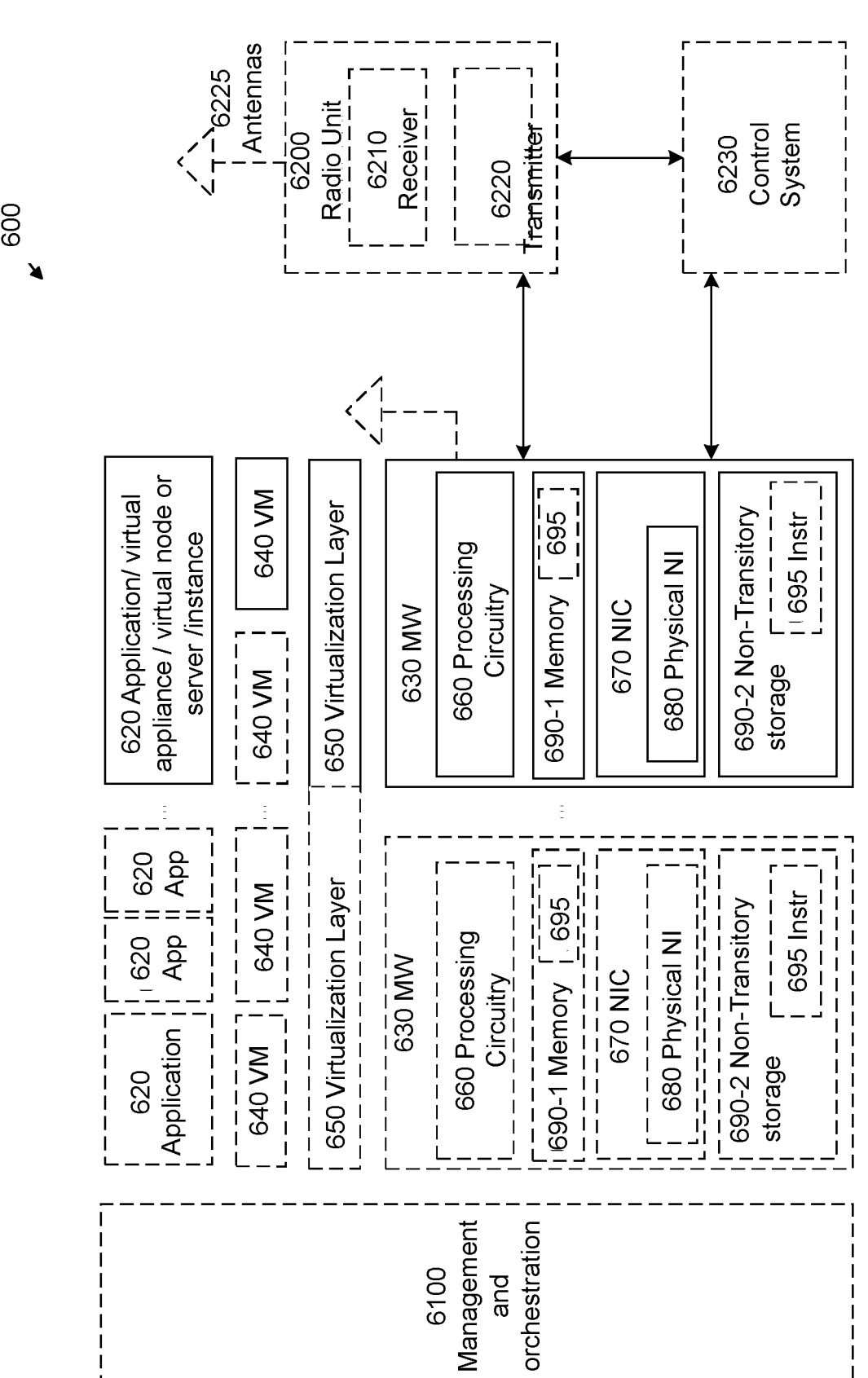
FIG. 11 illustrates a virtualization environment in which functions implemented by some embodiments may be virtualized, according to certain embodiments.

FIG. 11 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 11, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 11.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be affected with the use of control system 6230 which may alternatively be used for communication between the hardware nodes 630 and radio units 6200.

Figure 12:
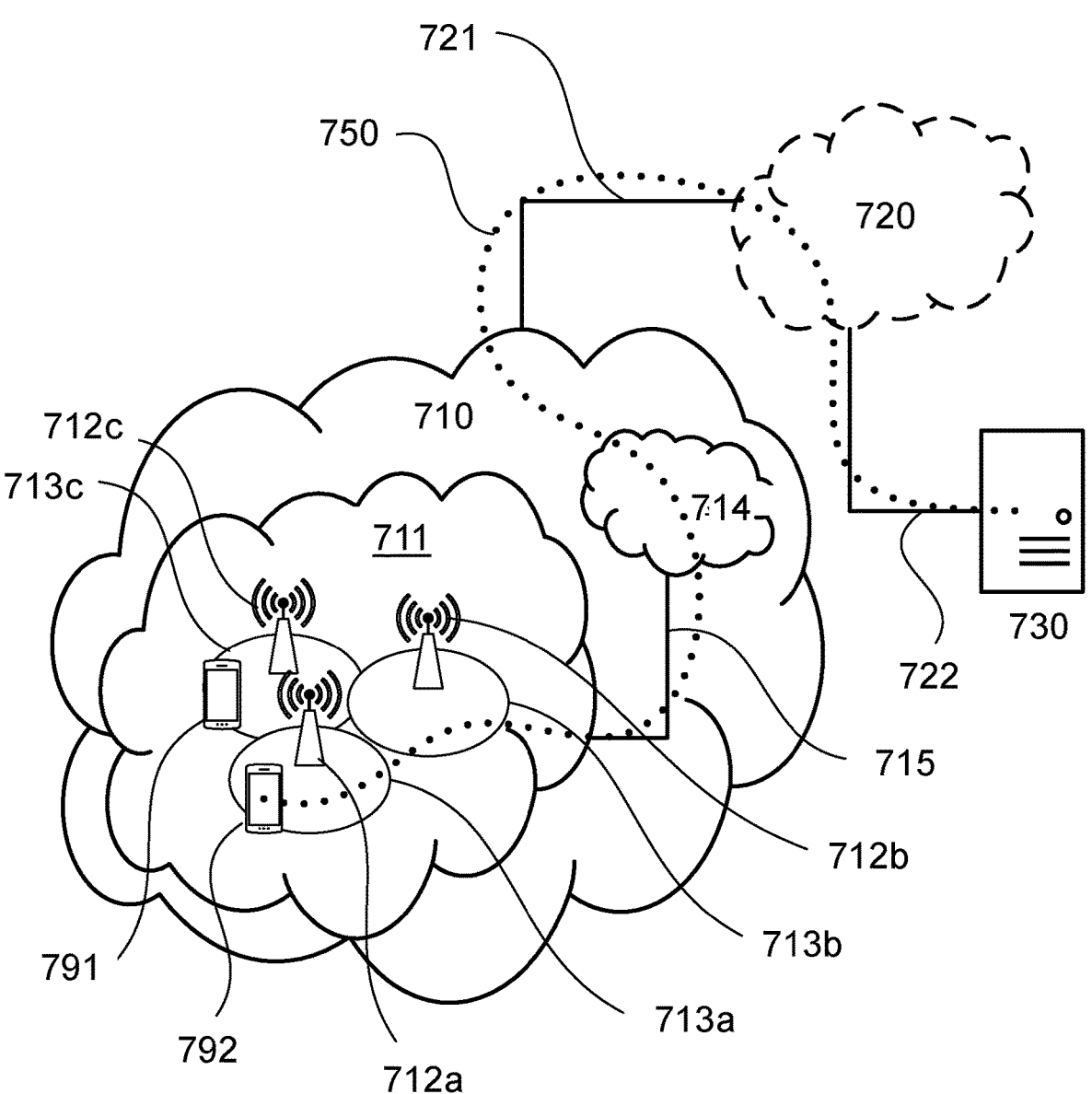
FIG. 12 illustrates a telecommunication network connected via an intermediate network to a host computer, according to certain embodiments.

FIG. 12 illustrates a telecommunication network connected via an intermediate network to a host computer in accordance with some embodiments.

With reference to FIG. 12, in accordance with an embodiment, a communication system includes telecommunication network 710, such as a 3GPP-type cellular network, which comprises access network 711, such as a radio access network, and core network 714. Access network 711 comprises a plurality of base stations 712*a*, 712*b*, 712*c*, such as NBs, eNBs, gNBs or other types of wireless access points, each defining a corresponding coverage area 713*a*, 713*b*, 713*c*. Each base station 712*a*, 712*b*, 712*c* is connectable to core network 714 over a wired or wireless connection 715. A first UE 791 located in coverage area 713*c* is configured to wirelessly connect to, or be paged by, the corresponding base station 712*c*. A second UE 792 in coverage area 713*a* is wirelessly connectable to the corresponding base station 712*a*. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 12 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 13:
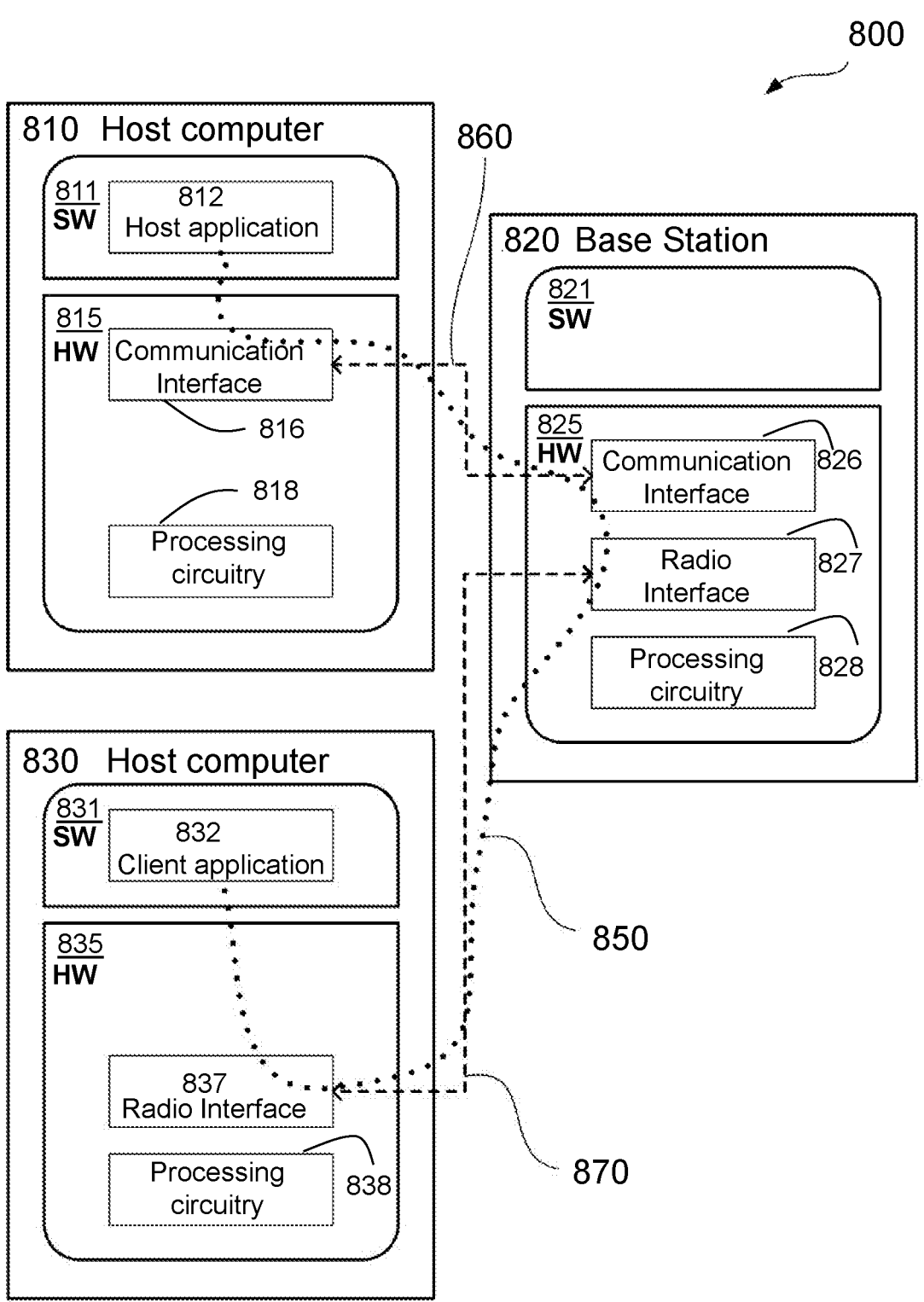
FIG. 13 illustrates a generalized block diagram of a host computer communicating via a base station with a user equipment over a partially wireless connection, according to certain embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 13) served by base station 820. Communication interface 826 may be configured to facilitate connection 860 to host computer 810. Connection 860 may be direct or it may pass through a core network (not shown in FIG. 13) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 13 may be similar or identical to host computer 730, one of base stations 712a, 712b, 712c and one of UEs 791, 792 of FIG. 12, respectively. This is to say, the inner workings of these entities may be as shown in FIG. 13 and independently, the surrounding network topology may be that of FIG. 12.

In FIG. 13, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figures 14, 15:
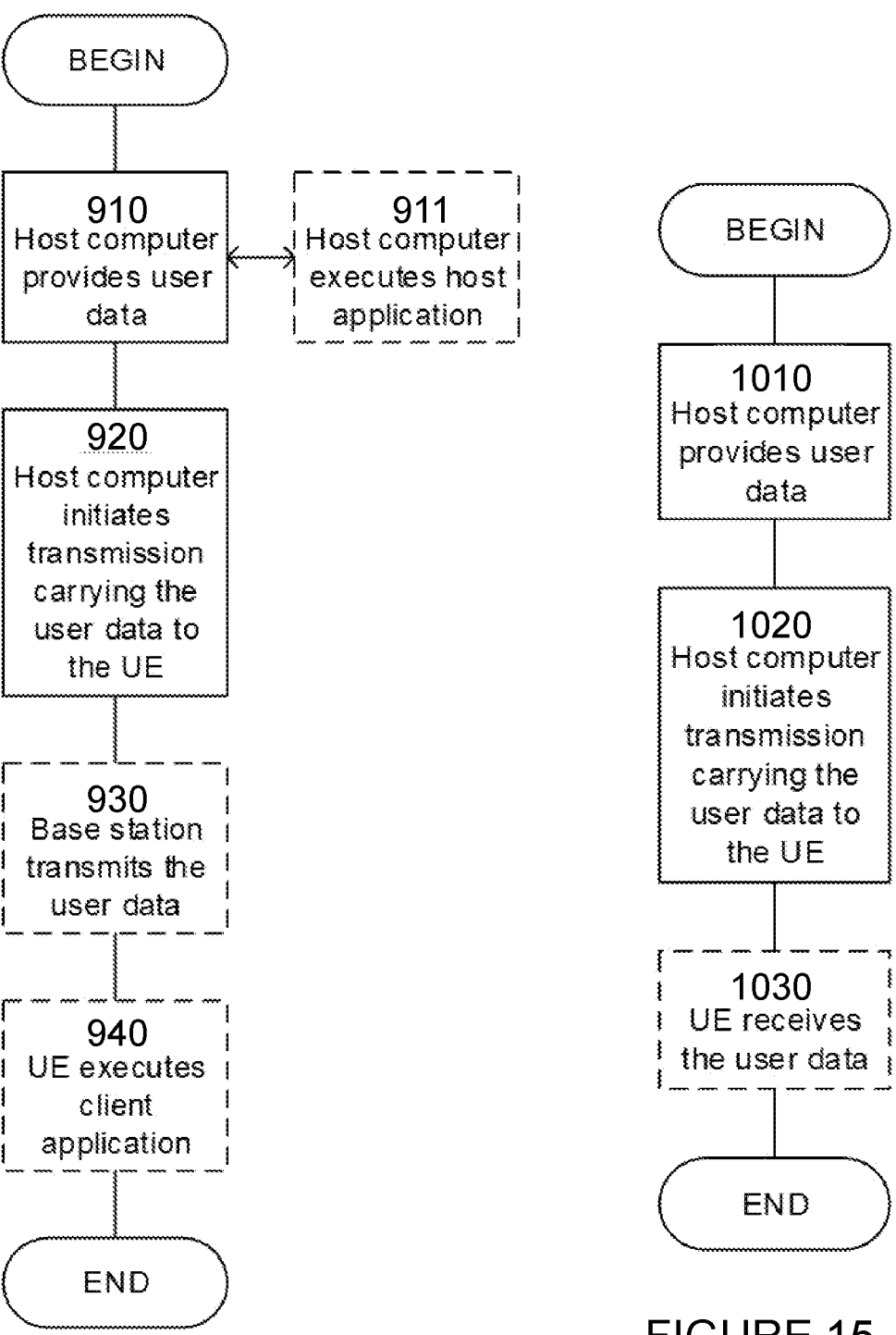
FIG. 14 illustrates a method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figures 16, 17:
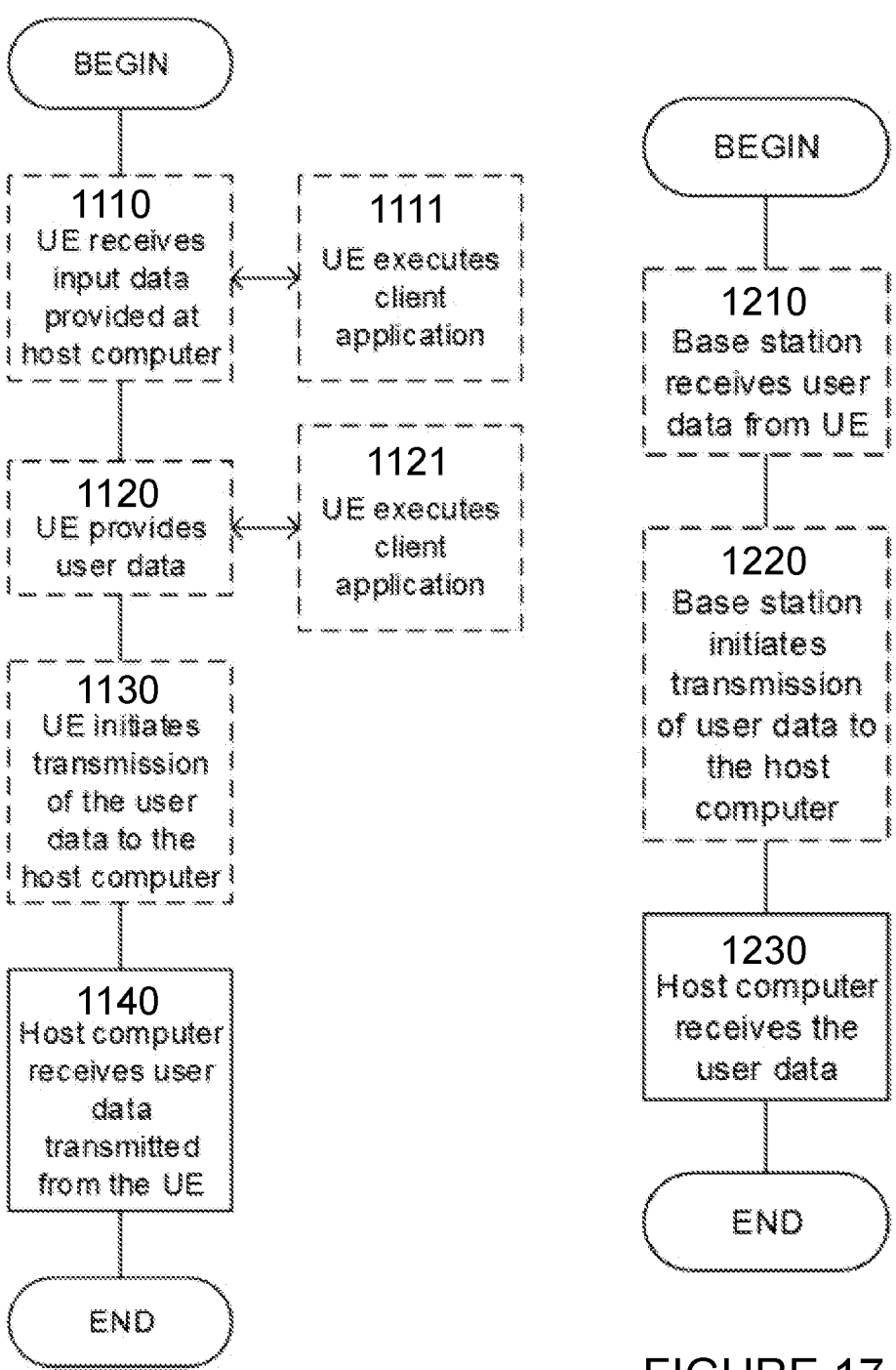
FIG. 16 illustrates another method implemented in a communication system, according to one embodiment.
FIG. 17 illustrates another method implemented in a communication system, according to one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data. the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Figure 18:
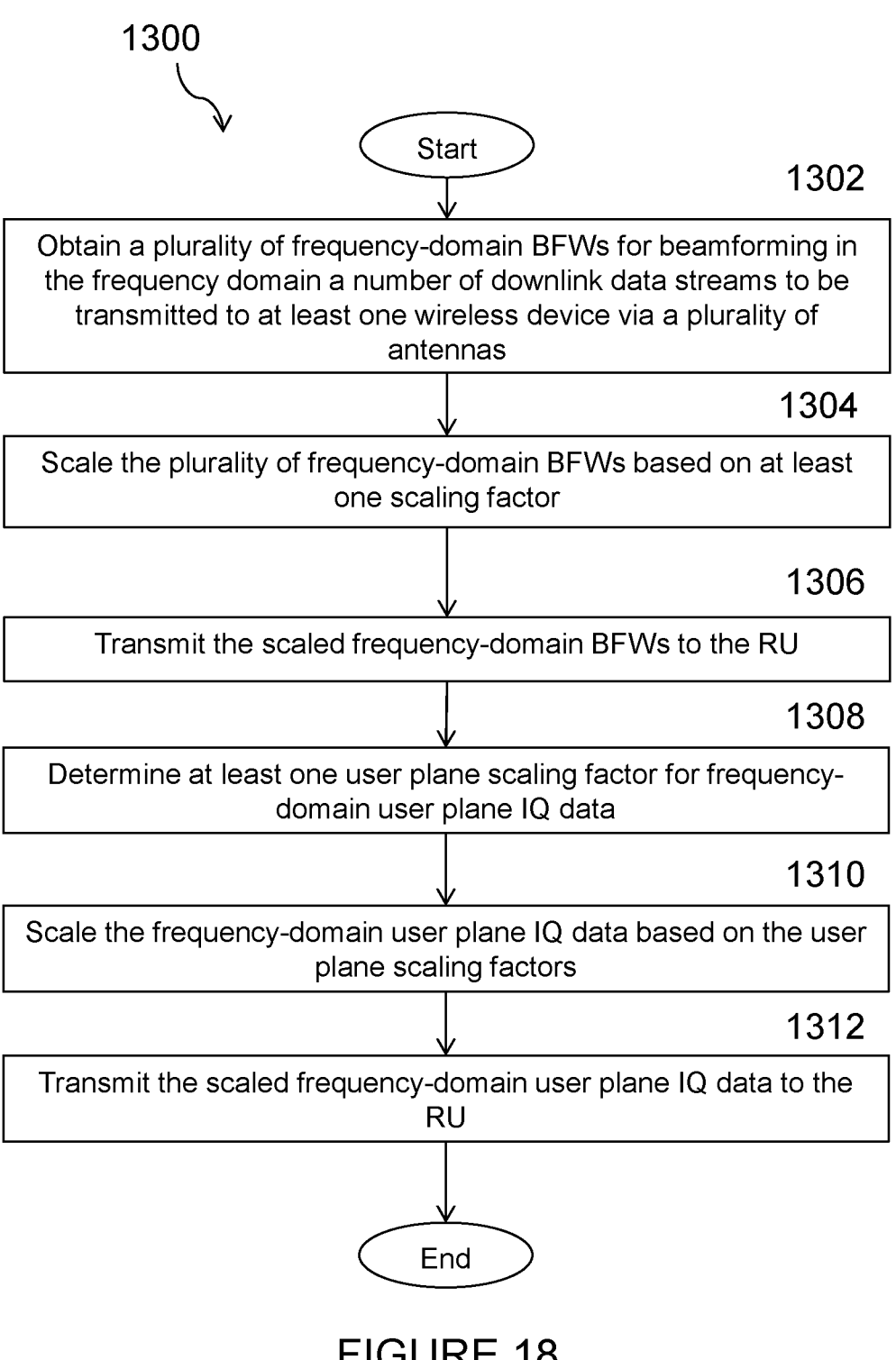
FIG. 18 illustrates another example method by a BBU, according to certain embodiments.

FIG. 18 depicts a method 1300 by a BBU 104 for scaling BFWs to assist a RU 102 with beamforming, according to certain embodiments. The method begins at step 1302 when the BBU 104 obtains a plurality of frequency-domain BFWs for beamforming in the frequency domain a number of downlink data streams to be transmitted to at least one wireless device via a plurality of antennas. At step 1304, the BBU 104 scales the plurality of frequency-domain BFWs based on at least one scaling factor. At step 1306, the BBU 104 transmits the scaled frequency-domain BFWs to the RU 102. At step 1308, the BBU 104 determines at least one user plane scaling factor for frequency-domain user plane IQ data. At step 1310, the BBU 104 the frequency-domain user plane IQ data based on the user plane scaling factors. At step 1312, the BBU 104 transmits the scaled frequency-domain user plane IQ data to the RU 102.

In a particular embodiment, the at least one user plane scaling factor comprises and/or is based on an inverse of the at least one scaling factor used to scale the frequency-domain BFWs.

In a particular embodiment, the at least one user plane scaling factor is determined based on the at least one scaling factor used to scale the frequency-domain BFWs.

In a particular embodiment, the at least one user plane scaling factor is determined to compensate for the at least one scaling factor used to scale the frequency-domain BFWs.

In a particular embodiment, the at least one user plane scaling factor is determined based on at least one of the frequency-domain BFWs.

In a particular embodiment, the at least one user plane scaling factor comprises a plurality of user plane scaling factors.

In a particular embodiment, each of the user plane scaling factors is associated with a particular one of a plurality of layers.

In a particular embodiment, the frequency-domain user plane IQ data comprises I and Q values for each one of the plurality of layers.

In a particular embodiment, each of the user plane scaling factors is associated with a particular one of a plurality of spatial streams.

In a particular embodiment, each of the user plane scaling factors is associated with a subcarrier and/or subcarrier group.

As used herein, it may be recognized that each layer can cover several subcarrier groups, and each group may consist of a number of subcarriers. Each subcarrier will carry a part of the user layer data. Because the channel is different for different subcarriers (but reasonably the same within a subcarrier group), there may be separate beamforming coefficients for each subcarrier group. Accordingly, there may be a separate BFW scaling factor for each subcarrier group used by the user layer and consequently a separate scaling factor to be applied to the part of the layer's user data that is to be transmitted on the subcarriers of each subcarrier group. The beamforming weights (and hence the scaling factors) will typically be based on, for example, a subcarrier in the middle of the subcarrier group. Thus, it may be recognized that the BFWs and scaling factors are per layer and per subcarrier group.

In a particular embodiment, the at least one user plane scaling factor is determined based on: at least one power allocation scaling factor, and/or at least one antenna power scaling factor.

In a particular embodiment, the user plane IQ data comprises a plurality of frequency-domain user-layer signals.

In a particular embodiment, the frequency-domain user plane IQ data comprises I and Q values for each one of the plurality of layers being associated with at least one subcarrier and/or at least one subcarrier group for which the frequency-domain BFWs are obtained.

In a particular embodiment, the BBU 104 quantizes the scaled frequency-domain BFWs to a predefined fixed-point data format before transmitting the scaled frequency-domain BFWs to the RU 102.

In a particular embodiment, the at least one scaling factor used for scaling the frequency-domain BFWs increases an accuracy level of the frequency-domain BFWs after quantization.

In a particular embodiment, the BBU 104 quantizes the scaled frequency-domain user plane IQ data to a predefined data format before transmitting the scaled frequency-domain user plane IQ data to the RU 102.

In a particular embodiment, the frequency-domain user plane IQ data is sent to the RU 102 in a number of user plane messages.

In a particular embodiment, the scaled frequency-domain BFWs are sent to the RU 102 in at least one control plane message.

In a particular embodiment, the BBU 104 sends scheduling information for the frequency-domain user plane IQ data in at least one control plane message.

In a particular embodiment, the 104 and the RU 102 are associated with a distributed network node.

In various particular embodiments, the method may additionally or alternatively include one or more of the steps or features of the Group A, Group B. and Group C Example Embodiments described below.

Figure 19:
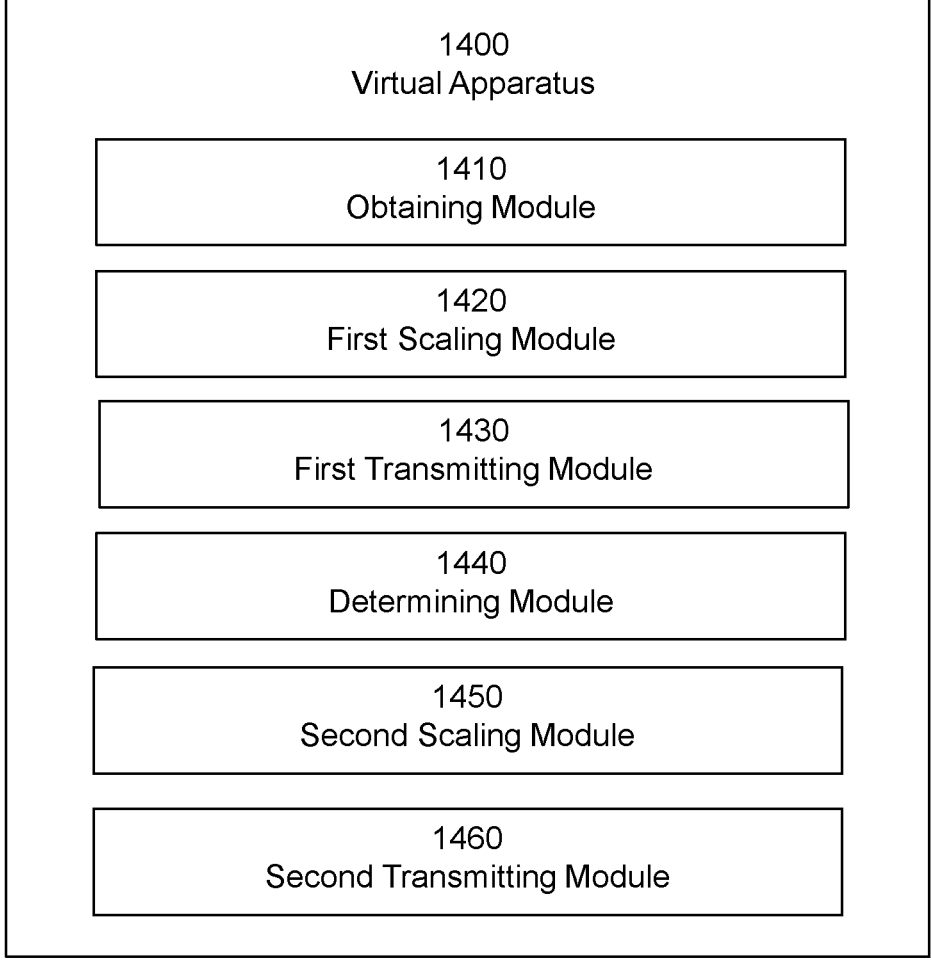
FIG. 19 illustrates an example virtual apparatus, according to certain embodiments.

FIG. 19 illustrates a schematic block diagram of a virtual apparatus 1400 in a wireless network (for example, the wireless network shown in FIG. 7). The apparatus may be implemented in a wireless device or network node (e.g., wireless device 410 or network node 460 shown in FIG. 7). Apparatus 1400 is operable to carry out the example method described with reference to FIG. 18 and possibly any other processes or methods disclosed herein. It is also to be understood that the method of FIG. 18 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1410, first scaling module 1420, first transmitting module 1430, determining module 1440, second scaling module 1450, and second transmitting module 1460, and any other suitable units of apparatus 1400 to perform corresponding functions according one or more embodiments of the present disclosure.

According to certain embodiments, obtaining module 1410 may perform certain of the obtaining functions of the apparatus 1400. For example, obtaining module 1410 may obtain a plurality of frequency-domain BFWs for beamforming in the frequency domain a number of downlink data streams to be transmitted to at least one wireless device via a plurality of antennas.

According to certain embodiments, first scaling module 1420 may perform certain of the scaling functions of the apparatus 1400. For example, first scaling module 1420 may scale the plurality of frequency-domain BFWs based on at least one scaling factor.

According to certain embodiments, first transmitting module 1430 may perform certain of the transmitting functions of the apparatus 1400. For example, first transmitting module 1430 may the scaled frequency-domain BFWs to the RU.

According to certain embodiments, determining module 1440 may perform certain of the determining functions of the apparatus 1400. For example, determining module 1440 may determine at least one user plane scaling factor for frequency-domain user plane IQ data.

According to certain embodiments, second scaling module 1450 may perform certain of the scaling functions of the apparatus 1400. For example, second scaling module may scale the frequency-domain user plane IQ data based on the user plane scaling factors.

According to certain embodiments, second transmitting module 1460 may perform certain of the transmitting functions of the apparatus 1400. For example, second transmitting module 1460 may transmit the scaled frequency-domain user plane IQ data to the RU.

As used herein, the term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
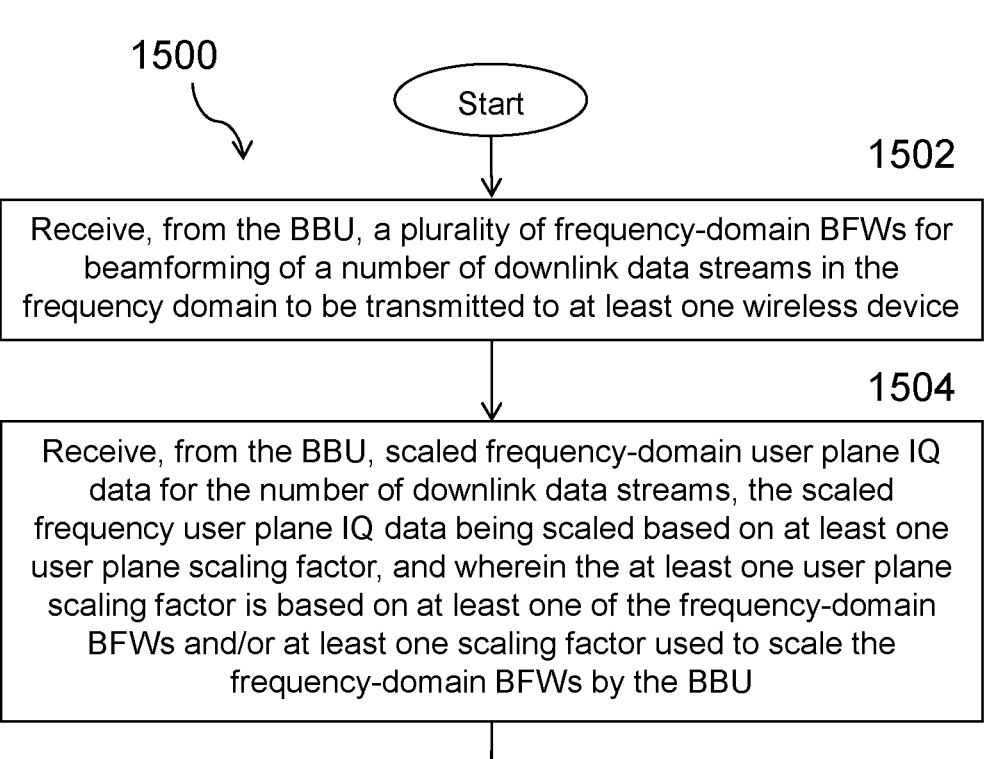
FIG. 20 illustrates another example method by a RU, according to certain embodiments.

FIG. 20 depicts a method 1500 by a RU 102 for performing beamforming based on frequency-domain BFWs scaled by a BBU 104. The method begins at step 1502 when the RU 102 receives, from the baseband unit, BBU 104, a plurality of frequency-domain BFWs for beamforming of a number of downlink data streams in frequency domain to be transmitted to at least one wireless device. At step 1504, the RU 102 receives from the BBU 104, scaled frequency-domain user plane IQ data for the number of downlink data streams. The scaled user plane IQ data is scaled based on at least one user plane scaling factor, and the at least one user plane scaling factor is based on at least one of the frequency-domain BFWs and/or at least one scaling factor used to scale the frequency-domain BFWs by the BBU.

In a particular embodiment, the RU conducts beamforming on the number of downlink data streams in frequency domain based on the plurality of frequency-domain BFWs and the scaled frequency-domain user plane IQ data.

In a particular embodiment, the RU uses a plurality of antennas to transmit the number of beamformed downlink data streams to the at least one wireless device.

In a particular embodiment, the at least one user plane scaling factor comprises and/or is based on an inverse of the at least one scaling factor used to scale the frequency domain BFWs.

In a particular embodiment, the at least one user plane scaling factor is determined to compensate for the at least one scaling factor used to scale the frequency domain BFWs.

In a particular embodiment, the at least one user plane scaling factor comprises a plurality of user plane scaling factors.

In a particular embodiment, each of the user plane scaling factors is associated with a particular one of a plurality of layers.

In a particular embodiment, the frequency-domain user plane IQ data comprises I and Q values for each one of the plurality of layers.

In a particular embodiment, each of the user plane scaling factors is associated with a particular one of a plurality of spatial streams.

In a particular embodiment, each of the user plane scaling factors is associated with a subcarrier and/or subcarrier group.

In a particular embodiment, the at least one user plane scaling factor is determined based on: at least one power allocation scaling factor, and/or at least one antenna power scaling factor.

In a particular embodiment, the scaled frequency domain user plane IQ data comprises a plurality of frequency-domain user-layer signals.

In a particular embodiment, the frequency domain BFWs are quantized to a predefined fixed-point data format.

In a particular embodiment, the at least one scaling factor increases an accuracy level of the frequency domain BFWs after quantization by the BBU 104.

In a particular embodiment, the scaled frequency domain user plane IQ data is quantized to a predefined data format.

In a particular embodiment, the scaled frequency domain user plane IQ data is received by the RU in a number of user plane messages.

In a particular embodiment, the scaled frequency-domain BFWs is received by the RU in at least one control plane message.

In a particular embodiment, the RU 102 receives scheduling information for the frequency-domain user plane IQ data in at least one control plane message.

In a particular embodiment, the BBU 104 and the RU 102 are associated with a distributed network node.

In various particular embodiments, the method may include one or more of any of the steps or features of the Group A, B, and Group C Example Embodiments described below.

Figure 21:
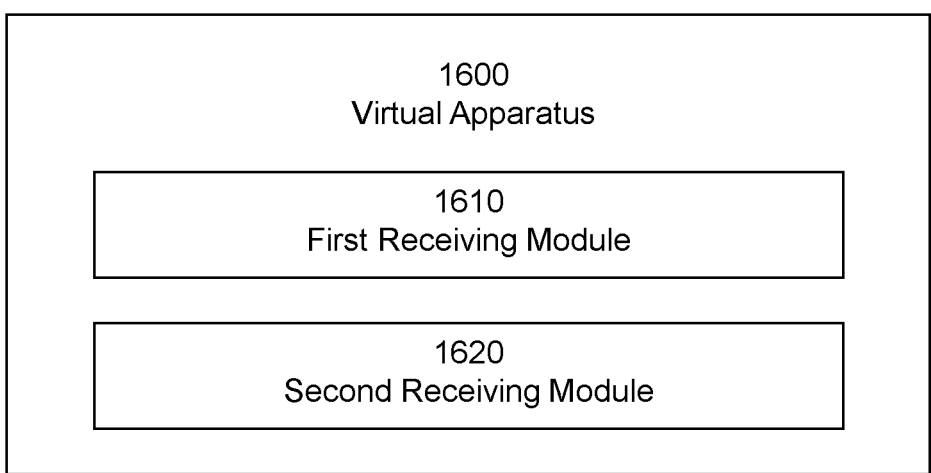
FIG. 21 illustrates another example virtual apparatus, according to certain embodiments.

FIG. 21 illustrates a schematic block diagram of a virtual apparatus 1600 in a wireless network (for example, the wireless network shown in FIG. 7). The apparatus may be implemented in a wireless device or network node (e.g., wireless device 410 or network node 460 shown in FIG. 7). Apparatus 1600 is operable to carry out the example method described with reference to FIG. 20 and possibly any other processes or methods disclosed herein. It is also to be understood that the method of FIG. 20 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 1610, second receiving module 1620, and any other suitable units of apparatus 1600 to perform corresponding functions according one or more embodiments of the present disclosure.

According to certain embodiments, first receiving module 1610 may perform certain of the receiving functions of the apparatus 1600. For example, first receiving module 1610 may receive, from the baseband unit, BBU, a plurality of frequency-domain BFWs for beamforming of a number of downlink data streams in frequency domain to be transmitted to at least one wireless device.

According to certain embodiments, second receiving module 1620 may perform certain other of the receiving functions of the apparatus 1600. For example, second receiving module 1620 may receive from the BBU, scaled frequency-domain user plane IQ data for the number of downlink data streams. The scaled user plane IQ data is scaled based on at least one user plane scaling factor, and the at least one user plane scaling factor is based on at least one of the frequency-domain BFWs and/or at least one scaling factor used to scale the frequency-domain BFWs by the BBU.

According to certain embodiments, using module P30 may perform certain of the using functions of the apparatus 1600. For example, using module P30 may use the plurality of antennas with the scaled transmit power to transmit a signal to the at least one wireless device.

Figure 22:
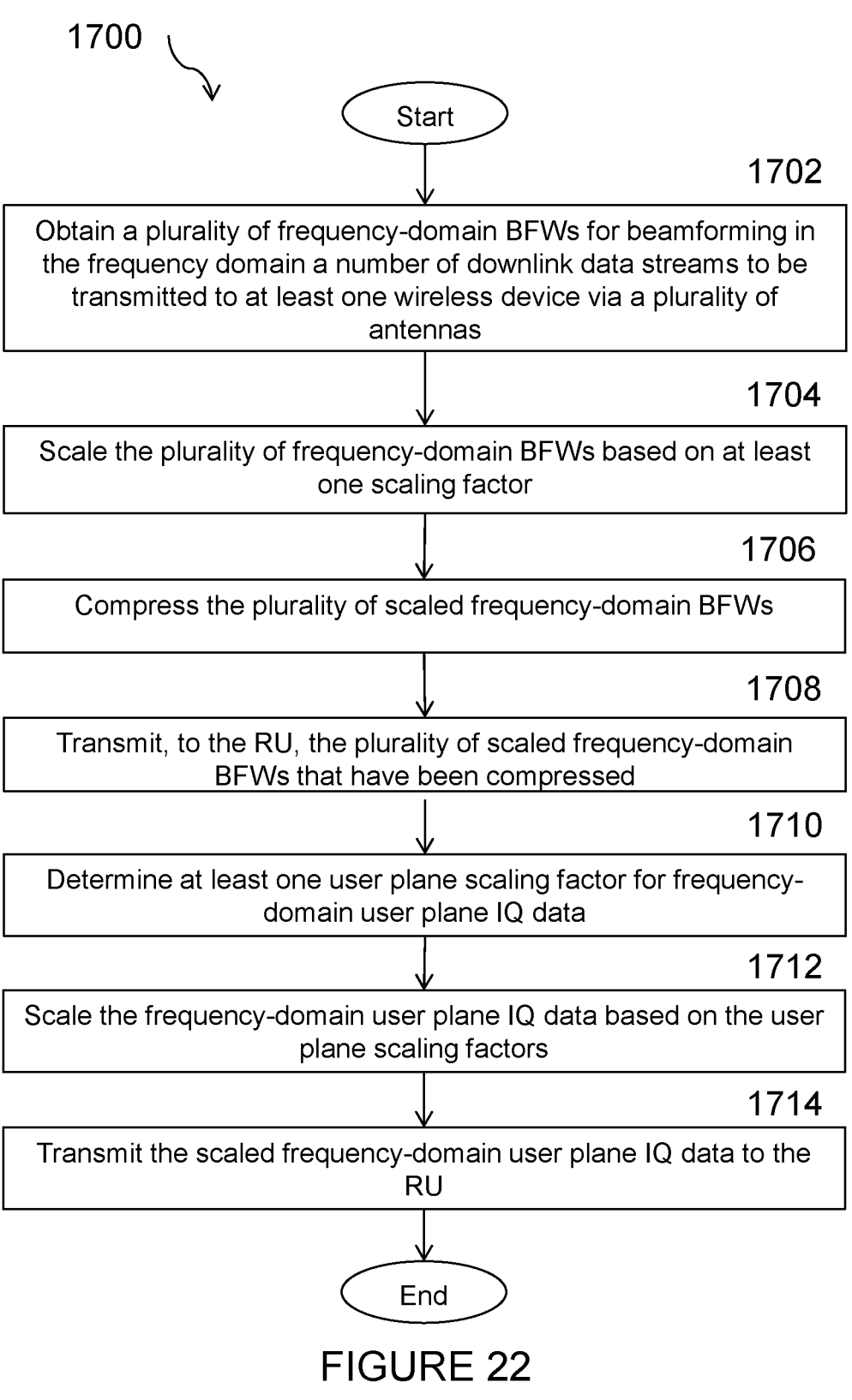
FIG. 22 illustrates another example method by a BBU, according to certain embodiments.

FIG. 22 illustrates another method 1700 by a BBU 104 for scaling BFWs to assist a RU (102) with beamforming, according to certain embodiments. The method begins at step 1702 when the BBU 104 obtains a plurality of frequency-domain BFWs for beamforming of a number of DL data streams in frequency-domain to be transmitted to at least one wireless device via a plurality of antennas. At step 1704, the BBU 104 scales the plurality of frequency-domain BFWs based on at least one scaling factor. At step 1706, the BBU 104 compresses the plurality of scaled frequency-domain BFWs. At step 1708, the BBU 104 transmits, to the RU 102, the scaled frequency-domain BFWs that have been compressed, At step 1710, the BBU 104 determines at least one user plane scaling factor for frequency-domain user plane IQ data, At step 1712, the BBU 104 scales the frequency-domain user plane IQ data based on the user plane scaling factors. At step 1714, the BBU transmits (1714) the scaled frequency-domain user plane IQ data to the RU.

In a particular embodiment, the at least one user plane scaling factor is determined to compensate for the at least one scaling factor used to scale the plurality of frequency-domain BFWs. For example, the at least one user plane scaling factor may comprise or be based on an inverse of the at least one scaling factor used to scale the frequency-domain BFWs. Thus, the at least one user plane scaling factor may be determined based on the at least one scaling factor used to scale the frequency-domain BFWs.

In a further particular embodiment, the at least one scaling factor used to scale the frequency-domain BFWs may be applied for compression purposes. The frequency-domain BFWs may additionally scaled for other scaling purposes such as, for example, for power scaling so as to make sure the BFWs do not increase the time-domain signal power more than a threshold. However, this kind of scaling doesn't need to be compensated. Thus, it may be recognized that in some embodiments the scaling of the IQ data at step 1712 does not address power scaling or other scaling that is not performed for compression purposes. Stated differently, the scaling of the IQ data at step 1712 addresses only the part of the BFW scaling that is to improve BFW compression, i.e. improve the signal quality after quantization and compression.

In a particular embodiment, the at least one user plane scaling factor comprises a plurality of user plane scaling factors. In a further particular embodiment, for example, each of the plurality of user plane scaling factors is associated with a particular one of a plurality of layers, and the frequency-domain user plane IQ data comprises I and Q values for each one of the plurality of layers. In another particular embodiment, each of the plurality of user plane scaling factors is associated with a particular one of a plurality of spatial streams. In still another further particular embodiment, each of the plurality of user plane scaling factors is associated with a subcarrier and/or subcarrier group.

In a further particular embodiment the user plane IQ data comprises a plurality of frequency-domain user-layer signals.

In a further particular embodiment compressing the plurality of scaled frequency-domain BFWs comprises includes compressing the plurality of scaled frequency-domain BFWs to a predefined fixed-point data format with fewer bits than an original number of bits representing the scaled frequency-domain BFWs.

In a further particular embodiment, the at least one scaling factor used for scaling the frequency-domain BFWs increases an accuracy of the frequency-domain BFWs after quantization.

In a further particular embodiment, the frequency-domain user plane IQ data is sent to the RU 102 in at least one user plane message.

In a further particular embodiment, the scaled frequency-domain BFWs are sent to the RU 102 in at least one control plane message.

In a further particular embodiment, the BBU 104 sends scheduling information for the frequency-domain user plane IQ data in at least one control plane message.

In a further particular embodiment, the BBU 104 and the RU 102 are associated with a distributed network node.

Figure 23:
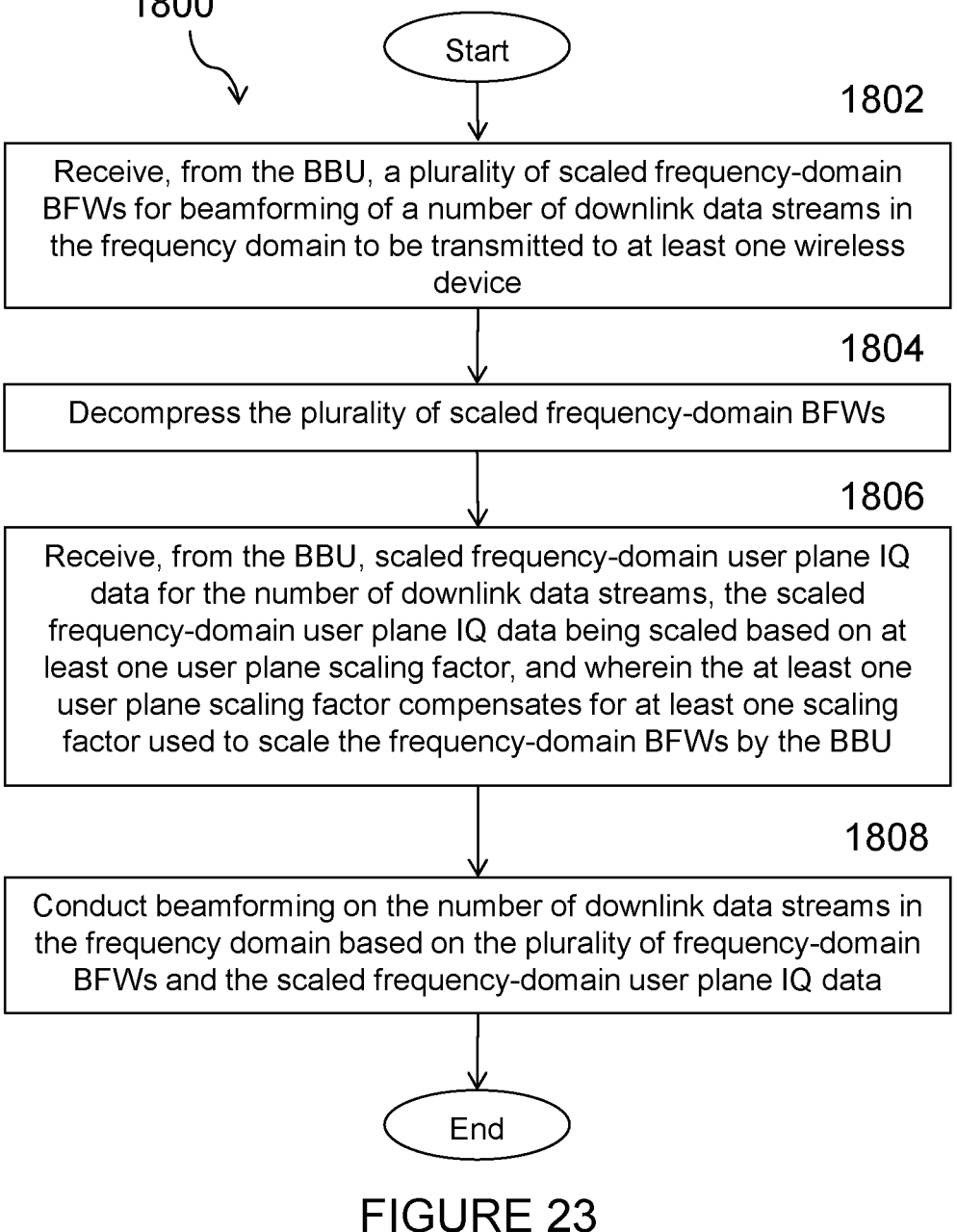
FIG. 23 illustrates another example method by a RU, according to certain embodiments.

FIG. 23 illustrates another method 1800 by a RU 102 for performing beamforming based on frequency-domain BFWs scaled by a BBU 104, according to certain embodiments. The method begins at step 1802 when the RU 102 receives, from the BBU 104, a plurality of scaled frequency-domain BFWs for beamforming of a number of DL data streams in frequency domain to be transmitted to at least one wireless device. At step 1804, the RU 102 decompresses the plurality of scaled frequency-domain BFWs. At step 1806, the RU 102 receives, from the BBU 104, scaled frequency-domain user plane IQ data for the number of downlink data streams. The scaled user plane IQ data is scaled based on at least one user plane scaling factor, and the at least one user plane scaling factor compensates for at least one scaling factor used to scale the BFWs by the BBU. At step 1808, the RU 102 conducts beamforming on the number of DL data streams in the frequency domain based on the plurality of frequency-domain BFWs and the scaled frequency-domain user plane IQ data.

In a particular embodiment, the at least one user plane scaling factor comprises a plurality of user plane scaling factors. In a further particular embodiment, each of the plurality of user plane scaling factors is associated with a particular one of a plurality of layers, and the frequency-domain user plane IQ data comprises I and Q values for each one of the plurality of layers. In another particular embodiment, each of the user plane scaling factors is associated with a particular one of a plurality of spatial streams. In still another particular embodiment, each of the user plane scaling factors is associated with a subcarrier and/or subcarrier group.

In a particular embodiment, the scaled frequency domain user plane IQ data comprises a plurality of frequency-domain user-layer signals.

In a particular embodiment, the plurality of frequency domain BFWs are compressed to a predefined fixed-point data format with fewer bits than the original number of bits representing the scaled frequency-domain BFWs.

In a particular embodiment, the at least one scaling factor used for scaling the plurality of frequency-domain BFWs increases an accuracy of the plurality of frequency domain BFWs after quantization by the BBU 104.

In a particular embodiment, the scaled frequency domain user plane IQ data is received by the RU 102 in at least one user plane message.

In a particular embodiment, the plurality of scaled frequency-domain BFWs is received by the RU 102 in at least one control plane message.

In a particular embodiment, the RU 102 receives scheduling information for the frequency-domain user plane IQ data in at least one control plane message.

In a particular embodiment, the BBU 104 and the RU 102 are associated with a distributed network node.

EXAMPLE EMBODIMENTS

Group A Example Embodiments

Example Embodiment A1. A method performed by a baseband unit, BBU, for scaling beamforming weights, BFWs, to assist a Radio Unit, RU, with beamforming, the method comprising: obtaining a plurality of frequency-domain BFWs for beamforming of a number of downlink data streams in frequency-domain to be transmitted to at least one wireless device via a plurality of antennas; scaling the plurality of frequency-domain BFWs based on at least one scaling factor; transmitting the scaled frequency-domain BFWs to the RU; determining at least one user plane scaling factor for frequency-domain user plane IQ data; scaling the frequency-domain user plane IQ data based on the user plane scaling factors; transmitting the scaled frequency-domain user plane IQ data to the RU.

Example Embodiment A2. The method of Example Embodiment A1, wherein the at least one user plane scaling factor comprises and/or is based on an inverse of the at least one scaling factor used to scale the frequency-domain BFWs.

Example Embodiment A3. The method of any one of Example Embodiments A1 to A2, wherein the at least one user plane scaling factor is determined based on the at least one scaling factor used to scale the frequency-domain BFWs.

Example Embodiment A4. The method of any one of Example Embodiments A1 to A3, wherein the at least one user plane scaling factor is determined to compensate for the at least one scaling factor used to scale the frequency-domain BFWs.

Example Embodiment A5. The method of any one of Example Embodiments A1 to A4, wherein the at least one user plane scaling factor is determined based on at least one of the frequency-domain BFWs.

Example Embodiment A6. The method of any one of Example Embodiments A1 to A5, wherein the at least one user plane scaling factor comprises a plurality of user plane scaling factors.

Example Embodiment A7a. The method of Example Embodiment A6, wherein each of the user plane scaling factors is associated with a particular one of a plurality of layers.

Example Embodiment A7b. The method of Example Embodiment A7a, wherein the frequency-domain user plane IQ data comprises I and Q values for each one of the plurality of layers.

Example Embodiment A7c. The method of Example Embodiment A6, wherein each of the user plane scaling factors is associated with a particular one of a plurality of spatial streams.

Example Embodiment A7d. The method of any one of Example Embodiments A6 to A7c, wherein each of the user plane scaling factors is associated with a subcarrier and/or subcarrier group.

Example Embodiment A8. The method of any one of Example Embodiments A1 to A7b, wherein the at least one user plane scaling factor is determined based on: at least one power allocation scaling factor, and/or at least one antenna power scaling factor.

Example Embodiment A9. The method of any one of Example Embodiments A1 to A8, wherein the user plane IQ data comprises a plurality of frequency-domain user-layer signals.

Example Embodiment A10. The method of any one of Example Embodiments A1 to A9, further comprising quantizing the scaled frequency-domain BFWs to a predefined fixed-point data format before transmitting the scaled frequency-domain BFWs to the RU.

Example Embodiment A11. The method of any one of Example Embodiments A1 to A10, wherein the at least one scaling factor used for scaling the frequency-domain BFWs increases an accuracy level of the frequency-domain BFWs after quantization.

Example Embodiment A12. The method of any one of Example Embodiments A1 to A11, further comprising quantizing the scaled frequency-domain user plane IQ data to a predefined data format before transmitting the scaled frequency-domain user plane IQ data to the RU.

Example Embodiment A13. The method of any one of Example Embodiments A1 to A12, wherein the frequency-domain user plane IQ data is sent to the RU in a number of user plane messages.

Example Embodiment A14. The method of any one of Example Embodiments A1 to A13, wherein the scaled frequency-domain BFWs are sent to the RU in at least one control plane message.

Example Embodiment A15. The method of any one of Example Embodiments A1 to A14, further comprising sending scheduling information for the frequency-domain user plane IQ data in at least one control plane message.

Example Embodiment A16. The method of any one of Example Embodiments A1 to A15, wherein the BBU and the RU are associated with a distributed network node.

Example Embodiment A17. A BBU comprising processing circuitry configured to perform any of the methods of Example Embodiments A1 to A16.

Example Embodiment A18. A computer program comprising instructions which when executed on a computer perform any of the methods of Example Embodiments A1 to A16.

Example Embodiment A19. A computer program product comprising computer program, the computer program comprising instructions which when executed on a computer perform any of the methods of Example Embodiments A1 to A16.

Example Embodiment A20. A non-transitory computer readable medium storing instructions which when executed by a computer perform any of the methods of Example Embodiments A1 to A16.

Group B Embodiments

Example Embodiment B1. A method by a radio unit, RU, for performing beamforming based on frequency-domain beamforming weights, BFWs, scaled by a baseband unit, BBU, the method comprising: receiving, from a baseband unit, BBU, a plurality of frequency-domain BFWs for beamforming of a number of downlink data streams in frequency domain to be transmitted to at least one wireless device; and receive from the BBU, scaled frequency-domain user plane IQ data for the number of downlink data streams, the scaled user plane IQ data being scaled based on at least one user plane scaling factor, and wherein the at least one user plane scaling factor is based on at least one of the BFWs and/or at least one scaling factor used to scale the BFWs by the BBU.

Example Embodiment B2. The method of Example Embodiment B1, further comprising: conducting beamforming on the number of downlink data streams in frequency domain based on the plurality of frequency-domain BFWs and the scaled frequency-domain user plane IQ data.

Example Embodiment B3. The method of Example Embodiment B2, further comprising using a plurality of antennas to transmit the number of beamformed downlink data streams to the at least one wireless device.

Example Embodiment B4. The method of any one of Example Embodiments B1 to B3, wherein the at least one user plane scaling factor comprises and/or is based on an inverse of the at least one scaling factor used to scale the frequency domain BFWs.

Example Embodiment B5. The method of any one of Example Embodiments B1 to B4, wherein the at least one user plane scaling factor is determined to compensate for the at least one scaling factor used to scale the frequency domain BFWs.

Example Embodiment B6. The method of any one of Example Embodiments B1 to B5, wherein the at least one user plane scaling factor comprises a plurality of user plane scaling factors.

Example Embodiment B7a. The method of Example Embodiment B6, wherein each of the user plane scaling factors is associated with a particular one of a plurality of layers.

Example Embodiment B7b. The method of Example Embodiment B7a, wherein the frequency-domain user plane IQ data comprises I and Q values for each one of the plurality of layers.

Example Embodiment B7c. The method of Example Embodiment B6, wherein each of the user plane scaling factors is associated with a particular one of a plurality of spatial streams.

Example Embodiment B7d. The method of any one of Example Embodiments B6 to B7c, wherein each of the user plane scaling factors is associated with a subcarrier and/or subcarrier group.

Example Embodiment B8. The method of any one of Example Embodiments B1 to B7d, wherein the at least one user plane scaling factor is determined based on: at least one power allocation scaling factor, and/or at least one antenna power scaling factor.

Example Embodiment B9. The method of any one of Example Embodiments B1 to B8, wherein the scaled frequency domain user plane IQ data comprises a plurality of frequency-domain user-layer signals.

Example Embodiment B10. The method of any one of Example Embodiments B1 to B9, wherein the frequency domain BFWs are quantized to a predefined fixed-point data format.

Example Embodiment B11.The method of any one of Example Embodiments B1 to B10, wherein the at least one scaling factor increases an accuracy level of the frequency domain BFWs after quantization by the BBU.

Example Embodiment B12. The method of any one of Example Embodiments B1 to B11, wherein the scaled frequency domain user plane IQ data is quantized to a predefined data format.

Example Embodiment B13.The method of any one of Example Embodiments B1 to B12, wherein the scaled frequency domain user plane IQ data is received by the RU in a number of user plane messages.

Example Embodiment B14. The method of any one of Example Embodiments B1 to B13, wherein the scaled frequency-domain BFWs is received by the RU in at least one control plane message.

Example Embodiment B16. The method of any one of Example Embodiments B1 to B15, further comprising receiving scheduling information for the frequency-domain user plane IQ data in at least one control plane message.

Example Embodiment B17. The method of any one of Example Embodiments B1 to B16, wherein the BBU and the RU are associated with a distributed network node.

Example Embodiment B18. A RU comprising processing circuitry configured to perform any of the methods of Example Embodiments B1 to B17.

Example Embodiment B19. A computer program comprising instructions which when executed on a computer perform any of the methods of Example Embodiments B1 to B17.

Example Embodiment B20. A computer program product comprising computer program, the computer program comprising instructions which when executed on a computer perform any of the methods of Example Embodiments B1 to B17.

Example Embodiment B21. A non-transitory computer readable medium storing instructions which when executed by a computer perform any of the methods of Example Embodiments B1 to B17.

Group C Example Embodiments

Example Embodiment C1. A network node comprising: processing circuitry configured to perform any of the steps of any of the Group A and Group B Example Embodiments; power supply circuitry configured to supply power to the wireless device.

Example Embodiment C2. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of the Group A and Group B Example Embodiments.

Example Embodiment C3. The communication system of the pervious embodiment further including the network node.

Example Embodiment C4. The communication system of the previous 2 embodiments, further including the wireless device, wherein the wireless device is configured to communicate with the network node.

Example Embodiment C5. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment C6. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of the Group A and Group B Example Embodiments.

Example Embodiment C7. The method of the previous embodiment, further comprising, at the network node, transmitting the user data.

Example Embodiment C8. The method of the previous 2 embodiments, wherein the user data is provided at the host computer by executing a host application, the method further comprising, at the wireless device, executing a client application associated with the host application.

Example Embodiment C9. A wireless device configured to communicate with a network node, the wireless device comprising a radio interface and processing circuitry configured to performs the of the previous 3 embodiments.

Example Embodiment C10. A communication system including a host computer comprising a communication interface configured to receive user data originating from a transmission from a wireless device to a network node, wherein the network node comprises a radio interface and processing circuitry, the network node's processing circuitry configured to perform any of the steps of any of the Group A and Group B Example Embodiments.

Example Embodiment C11. The communication system of the previous embodiment further including the network node.

Example Embodiment C12. The communication system of the previous 2 embodiments, further including the wireless device, wherein the wireless device is configured to communicate with the network node.

Example Embodiment C13. The communication system of the previous 3 embodiments, wherein: the processing circuitry of the host computer is configured to execute a host application; the wireless device is configured to execute a client application associated with the host application, thereby providing the user data to be received by the host computer.

Example Embodiment C14. The method of any of the previous embodiments, wherein the network node comprises a base station.

Example Embodiment C15. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a baseband unit, BBU, for scaling beamforming weights, BFWs, to assist a Radio Unit, RU, with beamforming, the method comprising:
   obtaining a plurality of frequency-domain BFWs for beamforming of a number of downlink data streams in frequency-domain to be transmitted to at least one wireless device via a plurality of antennas;
   scaling the plurality of frequency-domain BFWs based on at least one scaling factor;
   compressing the plurality of scaled frequency-domain BFWs;
   transmitting, to the RU, the plurality of scaled frequency-domain BFWs that have been compressed;
   based on the at least one scaling factor used to scale the frequency-domain BFWs, determining at least one user plane scaling factor for frequency-domain user plane In-phase/Quadrature, IQ, data;
   scaling the frequency-domain user plane IQ data based on the at least one user plane scaling factor;

transmitting the scaled frequency-domain user plane IQ data to the RU.

2. A method by a radio unit, RU, for performing beamforming based on frequency-domain beamforming weights, BFWs, scaled by a baseband unit, BBU, the method comprising:
   receiving, from the BBU, a plurality of scaled frequency-domain BFWs for beamforming of a number of downlink data streams in the frequency domain to be transmitted to at least one wireless device, wherein the plurality of scaled frequency-domain BFWs are compressed;
   decompressing the plurality of scaled frequency-domain BFWs;
   receiving, from the BBU, scaled frequency-domain user plane In-phase/Quadrature, IQ, data for the number of downlink data streams, the scaled frequency-domain user plane IQ data being scaled based on at least one user plane scaling factor, and wherein the at least one user plane scaling factor compensates for at least one scaling factor used to scale the frequency-domain BFWs by the BBU; and
   conducting beamforming on the number of downlink data streams in the frequency domain based on the plurality of scaled frequency-domain BFWs and the scaled frequency-domain user plane IQ data.

3. A baseband unit, BBU, for scaling beamforming weights, BFWs, to assist a Radio Unit, RU, with beamforming, the BBU adapted to:
   obtain a plurality of frequency-domain BFWs for beamforming of a number of downlink data streams in frequency-domain to be transmitted to at least one wireless device via a plurality of antennas;
   scale the plurality of frequency-domain BFWs based on at least one scaling factor;
   compress the plurality of scaled frequency-domain BFWs;
   transmit, to the RU, the plurality of scaled frequency-domain BFWs that have been compressed;
   based on the at least one scaling factor used to scale the frequency-domain BFWs, determine at least one user plane scaling factor for frequency-domain user plane In-phase/Quadrature, IQ, data;
   scale the frequency-domain user plane IQ data based on the at least one user plane scaling factor;
   transmit the scaled frequency-domain user plane IQ data to the RU.

4. The BBU of claim 3, wherein the at least one user plane scaling factor is determined to compensate for the at least one scaling factor used to scale the plurality of frequency-domain BFWs.

5. The BBU of claim 3, wherein the at least one user plane scaling factor comprises a plurality of user plane scaling factors.

6. The BBU of claim 5, wherein:
   each of the plurality of user plane scaling factors is associated with a particular one of a plurality of layers, and
   the frequency-domain user plane IQ data comprises I and Q values for each one of the plurality of layers.

7. The BBU of claim 6, wherein:
   each of the plurality of user plane scaling factors is associated with a particular one of a plurality of spatial streams.

8. The BBU of claim 6, wherein each of the plurality of user plane scaling factors is associated with a subcarrier and/or subcarrier group.

9. The BBU of claim 3, wherein the user plane IQ data comprises a plurality of frequency-domain user-layer signals.

10. The BBU of claim 3, wherein when compressing the plurality of scaled frequency-domain BFWs the BBU is adapted to compress the plurality of scaled frequency-domain BFWs to a predefined fixed-point data format with fewer bits than an original number of bits representing the scaled frequency-domain BFWs.

11. The BBU of claim 3, wherein the at least one scaling factor used for scaling the frequency-domain BFWs increases an accuracy of the frequency-domain BFWs after quantization.

12. The BBU of claim 3, wherein the frequency-domain user plane IQ data is sent to the RU in at least one user plane message.

13. The BBU of claim 3, wherein the scaled frequency-domain BFWs are sent to the RU in at least one control plane message.

14. The BBU of claim 3, wherein the BBU is adapted to send scheduling information for the frequency-domain user plane IQ data in at least one control plane message.

15. The BBU of claim 3, wherein the BBU and the RU are associated with a distributed network node.

16. A radio unit, RU, for performing beamforming based on frequency-domain beamforming weights, BFWs, scaled by a baseband unit, BBU, the RU adapted to:

receive, from a baseband unit, BBU, a plurality of scaled frequency-domain BFWs for beamforming of a number of downlink data streams in frequency domain to be transmitted to at least one wireless device, wherein the plurality of scaled frequency-domain BFWs are compressed; and decompress the plurality of scaled frequency-domain BFWs;

receive, from the BBU, scaled frequency-domain user plane In-phase/Quadrature, IQ, data for the number of downlink data streams, the scaled user plane IQ data being scaled based on at least one user plane scaling factor, and wherein the at least one user plane scaling factor compensates for at least one scaling factor used to scale the BFWs by the BBU; and conduct beamforming on the number of downlink data streams in the frequency domain based on the plurality of scaled frequency-domain BFWs and the scaled frequency-domain user plane IQ data.

17. The RU of claim 16, wherein the at least one user plane scaling factor comprises a plurality of user plane scaling factors.

18. The RU of claim 17, wherein:

each of the plurality of user plane scaling factors is associated with a particular one of a plurality of layers, and the frequency-domain user plane IQ data comprises I and Q values for each one of the plurality of layers.

19. The RU of claim 17, wherein: each of the user plane scaling factors is associated with a particular one of a plurality of spatial streams.

20. The RU of claim 18, wherein each of the user plane scaling factors is associated with a subcarrier and/or subcarrier group.

21. The RU of claim 16, wherein the scaled frequency domain user plane IQ data comprises a plurality of frequency-domain user-layer signals.

22. The RU of claim 16, wherein the plurality of frequency domain BFWs are compressed to a predefined fixed-point data format with fewer bits than the original number of bits representing the scaled frequency-domain BFWs.

23. The RU of claim 16, wherein the at least one scaling factor used for scaling the plurality of frequency-domain BFWs increases an accuracy of the plurality of frequency domain BFWs after quantization by the BBU.

24. The RU of claim 16, wherein the scaled frequency domain user plane IQ data is received by the RU in at least one user plane message.

25. The RU of claim 16, wherein the plurality of scaled frequency-domain BFWs is received by the RU in at least one control plane message.

26. The RU of claim 16, further adapted to receive scheduling information for the frequency-domain user plane IQ data in at least one control plane message.

* * * * *